United States Patent [19]
Saka et al.

[11] Patent Number: 5,268,793
[45] Date of Patent: Dec. 7, 1993

[54] ZOOM LENS SYSTEM

[75] Inventors: Manami Saka, Kyoto; Katsuhiro Takamoto, Nagaokakyo, both of Japan

[73] Assignee: Minolta Camera Kabushiki Kaisha, Japan

[21] Appl. No.: 10,582

[22] Filed: Jan. 28, 1993

[30] Foreign Application Priority Data

Jan. 29, 1992 [JP] Japan .................. 4-013747

[51] Int. Cl.$^5$ .......................... G02B 15/14
[52] U.S. Cl. ...................... 359/690; 359/716
[58] Field of Search .......... 359/690, 708, 676, 683, 359/716

[56] References Cited

U.S. PATENT DOCUMENTS

| | | | |
|---|---|---|---|
| 4,781,447 | 11/1988 | Ozawa | 359/690 |
| 4,925,280 | 5/1990 | Hashimoto | 359/691 |
| 4,984,876 | 1/1991 | Hata | 359/690 |
| 4,991,942 | 2/1991 | Fujibayashi | 359/690 |
| 4,991,943 | 2/1991 | Betensky | 359/684 |
| 4,995,707 | 2/1991 | Hashimoto | 359/687 |
| 5,103,343 | 4/1992 | Sekita | 359/684 |

FOREIGN PATENT DOCUMENTS

| | | |
|---|---|---|
| 54-30855 | 3/1979 | Japan . |
| 54-80143 | 6/1979 | Japan . |
| 57-27219 | 2/1982 | Japan . |
| 60-107013 | 6/1985 | Japan . |
| 61-110112 | 5/1986 | Japan . |
| 63-304218 | 12/1988 | Japan . |
| 64-44907 | 2/1989 | Japan . |
| 1223408 | 2/1989 | Japan . |
| 64-91110 | 4/1989 | Japan . |
| 1185608 | 7/1989 | Japan . |
| 239011 | 2/1990 | Japan . |
| 239116 | 2/1990 | Japan . |
| 3215807 | 9/1991 | Japan . |
| 3293309 | 12/1991 | Japan . |

*Primary Examiner*—Martin Lerner
*Assistant Examiner*—Evelyn A. Lester
*Attorney, Agent, or Firm*—Price, Gess & Ubell

[57] ABSTRACT

A variable lens system has three lens unit whose refractive powers are positive, negative and positive from an object side to the image side. Each lens unit consists of at least two lens elements. The central lens unit and the image side lens unit are shifted along an optical axis during a zooming operation. The lens system fulfills the conditions:

$$0.10 \leq fS \cdot \phi 1 \leq 0.15$$
$$11.890 < |\phi 2| \cdot Z^2 \cdot Y' < 18.649$$
$$83.401 < \frac{|\phi 2|}{\phi 1} \cdot \frac{Y'}{fS} \cdot Z^2 < 121.791$$

wherein fS, Z, and Y' represent the shortest focal length, a zoom ratio and an image height, respectively, of the lens system. $\phi 1$ and $\phi 2$ represent refractive powers of the object side and central lens units.

18 Claims, 18 Drawing Sheets

1st Embodiment

1st Embodiment

1st Embodiment
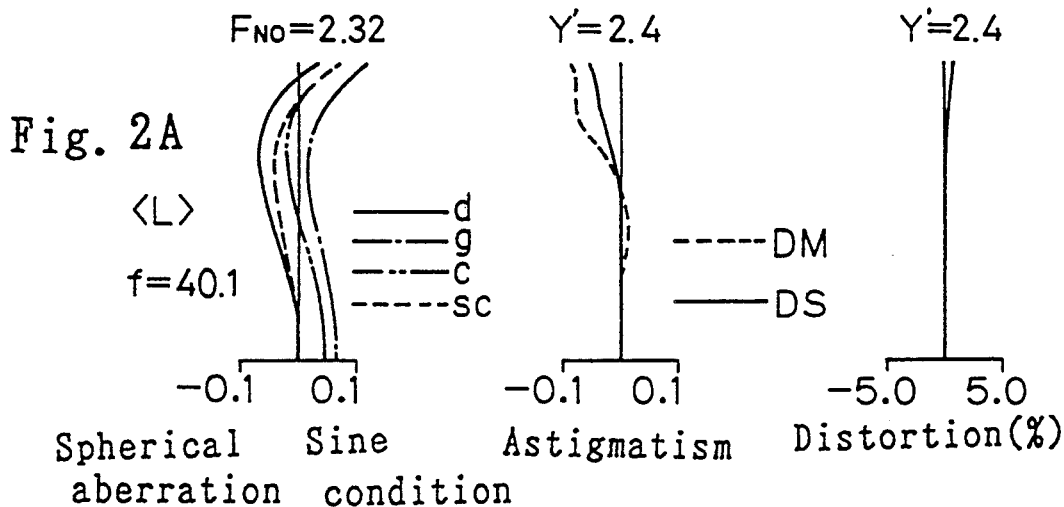
Fig. 2A ⟨L⟩ f=40.1
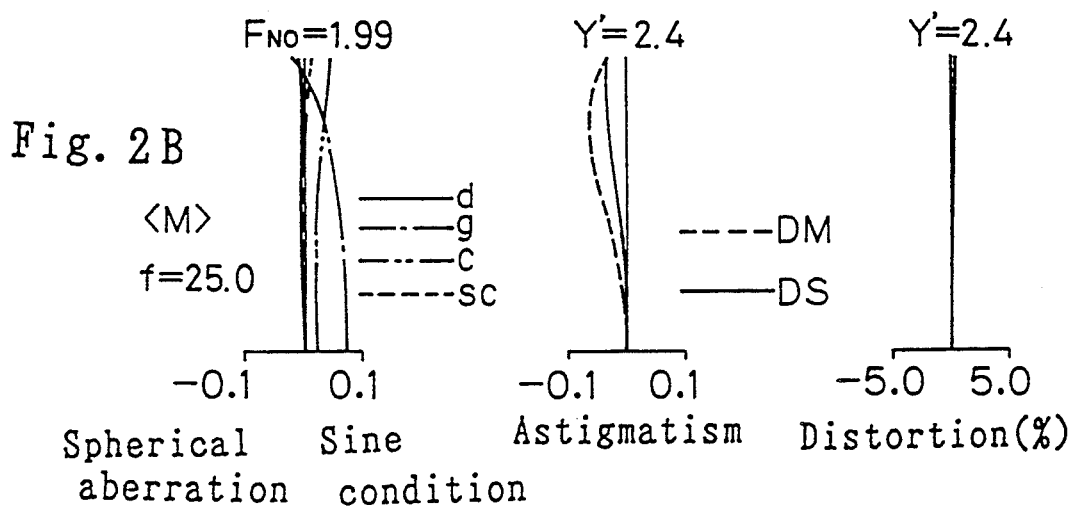
Fig. 2B ⟨M⟩ f=25.0
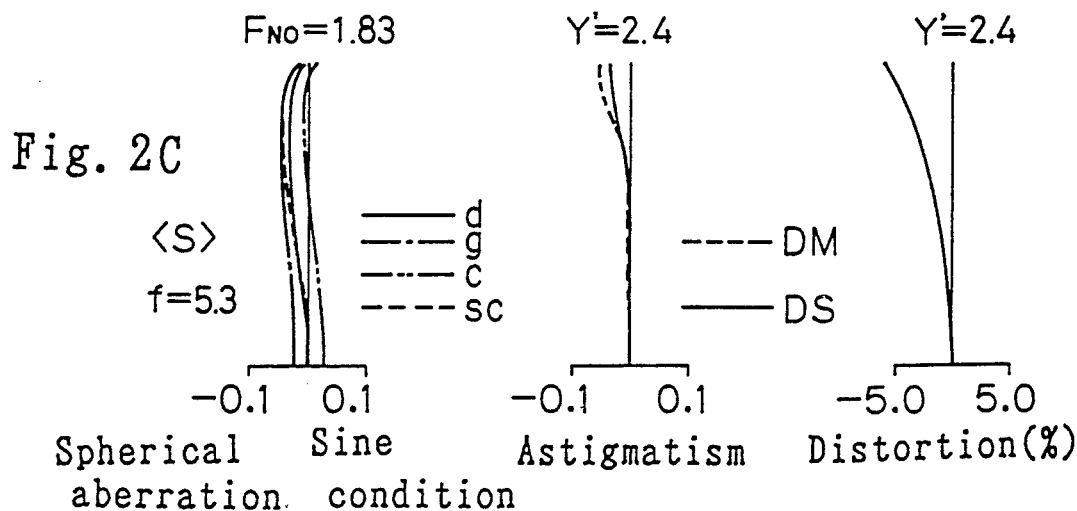
Fig. 2C ⟨S⟩ f=5.3

2nd Embodiment

2nd Embodiment

3rd Embodiment

3rd Embodiment

4th Embodiment

4th Embodiment

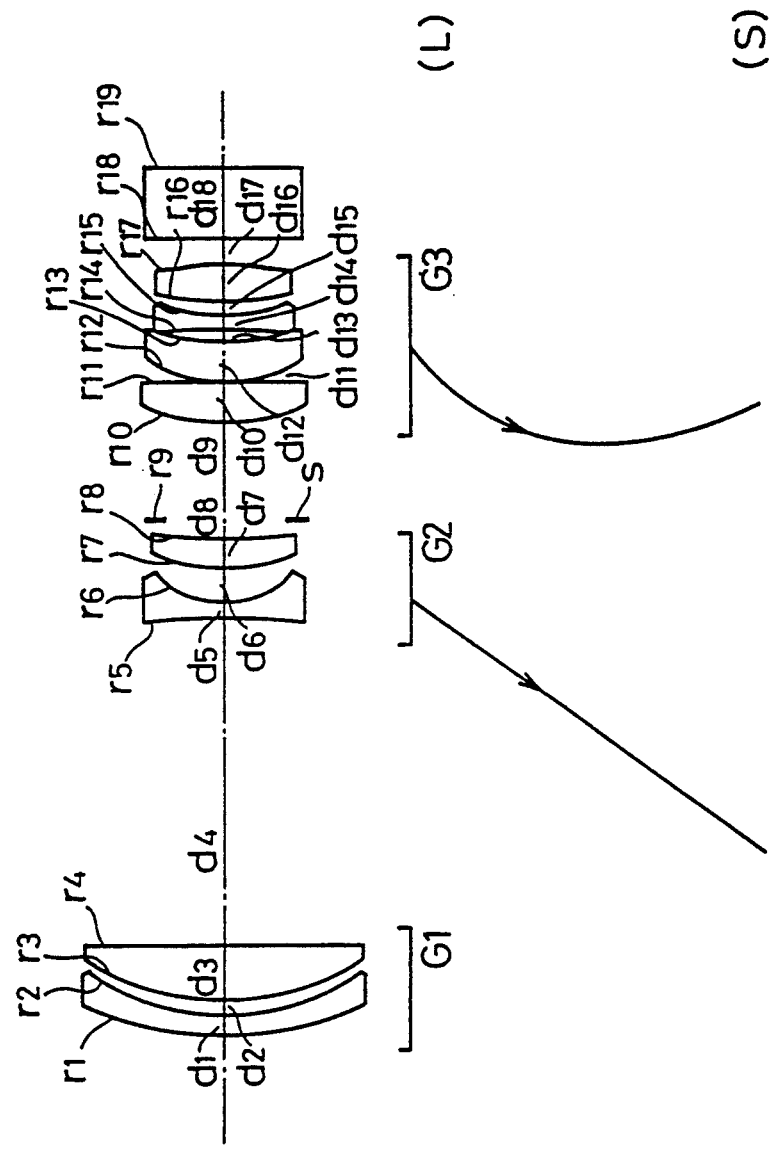

5th Embodiment

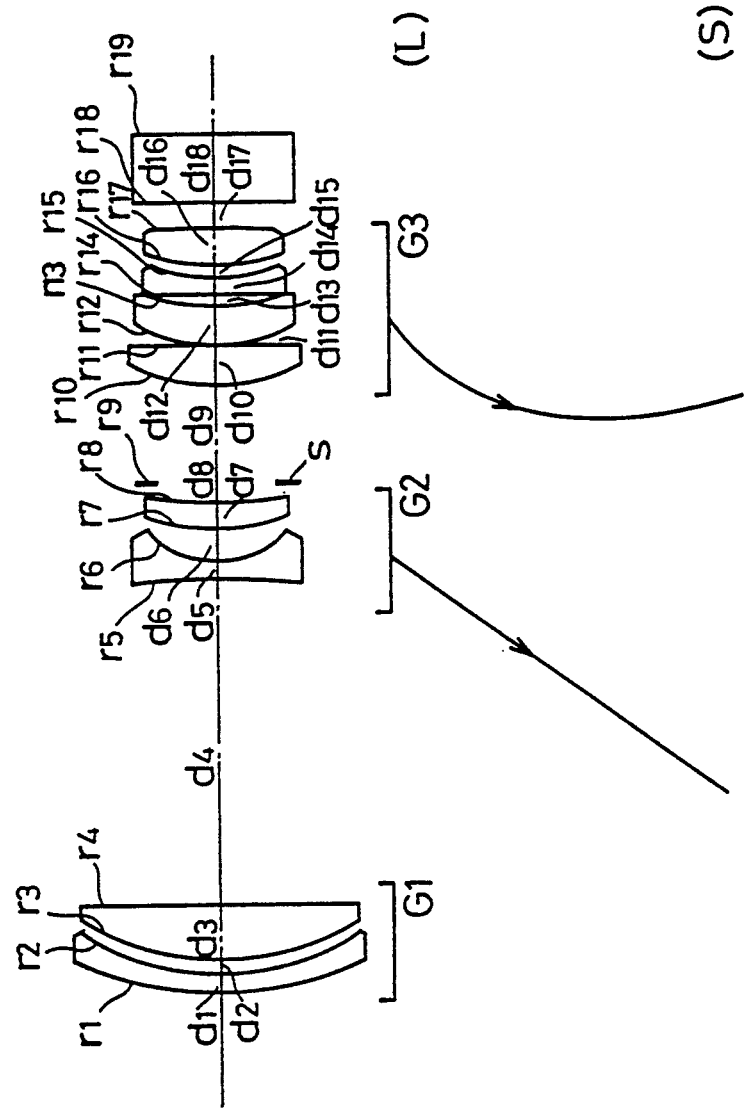

6th Embodiment

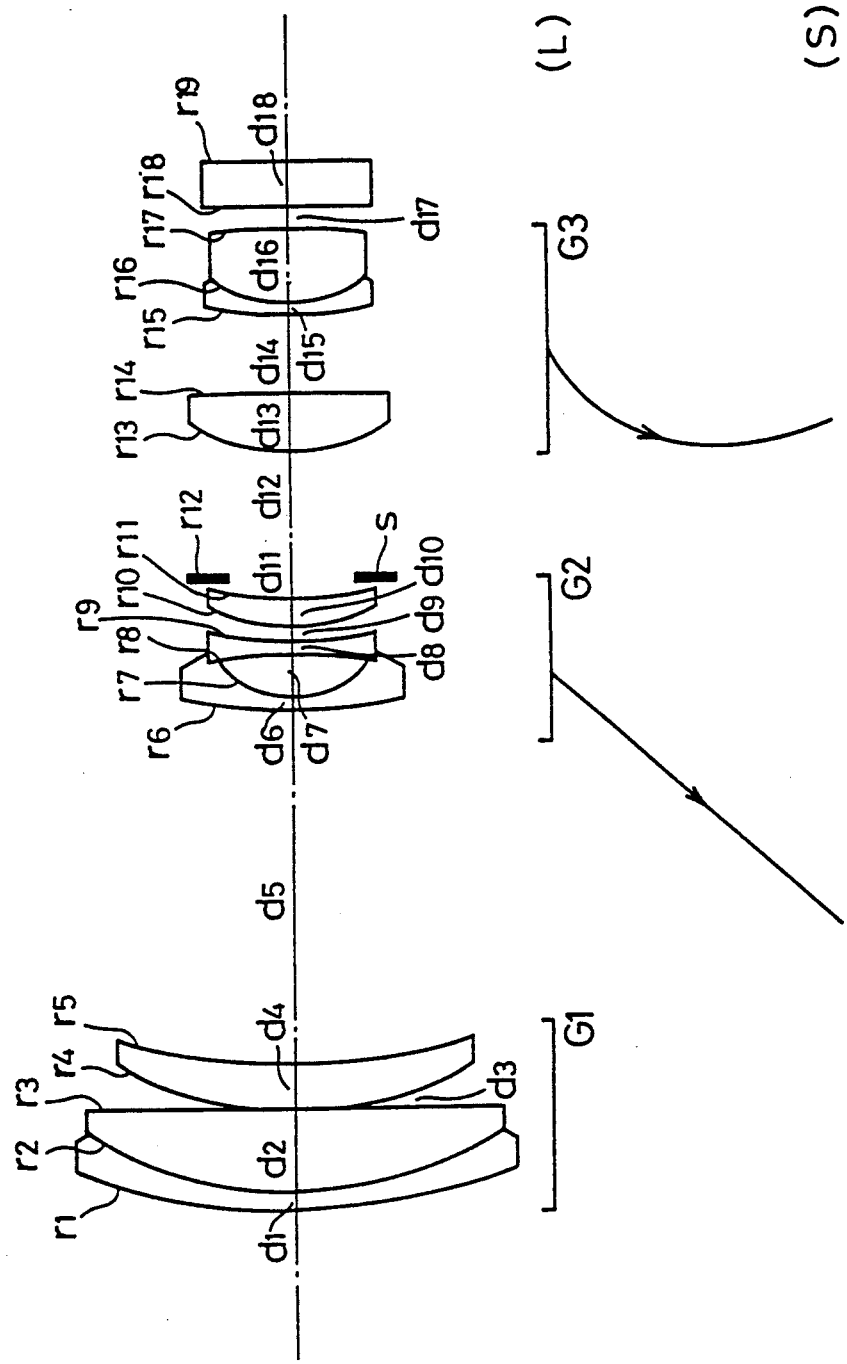

7th Embodiment

8th Embodiment

8th Embodiment

9th Embodiment

9th Embodiment

ZOOM LENS SYSTEM

BACKGROUND OF THE INVENTION

1. Field of the Invention

The present invention relates to a zoom lens system, and more specifically, to a zoom lens system having a large zoom ratio and applicable to a small-sized camera such as a video camera.

2. Description of the Prior Art

In recent years, camera bodies of cameras such as video cameras have remarkably been reduced in weight and volume compared to conventional ones owing to packaged electronic parts and improvement in integration rate thereof. The reduction of the prices and costs of camera bodies have also been remarkable.

Under such circumstances, the absolute values of the weight, volume and cost of the lens system with respect to the entire camera system have gradually been improved. However, since the relative values thereof with respect to the entire camera body are increasing year by year, a demand for a compacter, lower-cost lens system is increasing.

On the other hand, higher functions, such as a large aperture ratio for compensating for insufficient illumination caused due to the reduction in size of the imaging device and a higher performance for coping with higher pixels and higher resolution, have been demanded of lens systems.

Assuming here that the zoom ratio is approximately 8× which is currently popular in the field of the video camera, a large-aperture-ratio zoom lens system will be discussed which has an F number of approximately F 1.8. Many lens systems having such a specification have been disclosed in the form of zoom lens systems having four or five lens units. However, most of them, which have approximately 13 to 15 lens elements, no longer meet the current demand both in cost and size.

Recently, there has been a movement to reduce the number of lens elements by using aspherical surfaces. For example, a zoom lens system disclosed in Japanese Laid-open Patent Application S57-27219 is, although it is not an 8× magnification zoom lens system, a three-unit lens system of a positive, negative, positive configuration. The first lens unit and the second lens unit are moved along the optical axis as an image point position compensating unit (compensator) and as a zooming unit (variator), respectively, and by using one aspherical surface in each lens unit, a zoom lens system having an F number of F 1.6 is realized with 12 lens elements.

In this lens system, however, the zoom structure, lens configuration and lens arrangement are not effective, and the number of lens elements is not sufficiently reduced in view of its specification. Further, it is impossible for this zoom lens system to cope with a high zoom ratio of approximately 6×. This is because the zoom lens system has the following defect other than the above-mentioned inappropriate lens configuration and lens arrangement. That is, since the third lens unit is not moved during zooming, the first lens unit is inevitably moved as a compensator lens unit; in order to realize a high magnification of approximately 6× with this arrangement, the diameter of the first lens element (front lens element) considerably increases at a WIDE limit (shortest focal length condition) and in a middle range (middle focal length condition) compared to four- or five-unit zoom lens systems, so that the weight considerably increases.

On the contrary, Japanese Laid-open Patent Application No. S61-110112 and Japanese Laid-open Patent Application No. S60-107013 disclose four-unit zoom lens systems where considerably effective lens configuration, lens arrangement and aspherical surface arrangement are realized and where much fewer lens elements are used.

Japanese Laid-open Patent Application No. S61-110112 discloses a four-unit zoom lens system of a positive, negative, negative, positive configuration. By simplifying each lens unit and by effectively using four aspherical surfaces, a 6× magnification zoom lens system is realized with only eight lens elements. However, although the lens arrangement is excellent, the aberration performance is rather inferior. It is consequently difficult to realize the currently-demanded performance.

Japanese Laid-open Patent Application No. S60-107013 shows a schematic view of a four-unit zoom lens system of a positive, negative, positive, positive configuration including eight lens elements. Since no numerical data are shown, it is impossible to determine its performance and size. Moreover, since it is a 4× magnification zoom lens system having an F number of F2.0, it is impossible to apply it to the presently-discussed case (that is, 8× magnification zoom lens system having an F number of F 1.8).

Moreover, although the zoom ratio is low, Japanese Laid-open Patent Application No. S63-304218, Japanese Laid-open Patent Application No. S64-44907 and Japanese Laid-open Patent Application No. H1-223408 propose zoom lens systems where the number of lens elements is remarkably reduced by using aspherical surfaces. They are three-unit zoom lens systems of a positive, negative, positive configuration where a second lens unit includes one lens element and a first lens unit includes one or two lens elements.

In these zoom lens systems, since the second lens unit which serves as a zooming lens unit and largely moves along the optical axis includes one single negative lens element and chromatic aberration is not corrected in the second lens unit, variation in chromatic aberration due to zooming is large. It is consequently impossible to guarantee satisfactory performance when the lens systems are provided with a high zoom ratio. In fact, these prior arts realize zoom ratios of only from 2 to 3× and F numbers of only 2 to 4.

The above-mentioned variation in chromatic aberration cannot be improved even if many aspherical surfaces are used. In these zoom lens systems, if the currently-demanded performance (including chromatic aberration) is realized, a zoom ratio of only at most 3× can be realized, and it is consequently impossible to realize a zoom ratio of 8×.

Further, Japanese Laid-open Patent Application No. S64-91110 and Japanese Laid-open Patent Application No. H1-185608 propose novel zoom lens systems. A zoom lens system of Japanese Laid-open Patent Application No. S64-91110 realizes a zoom ratio of 3×, in spite of having a lens configuration nearly the same as that of a three-unit lens system, by causing it to work substantially as a four-unit lens system by separating a portion corresponding to a second lens unit into a negative unit consisting of two negative lens elements and a positive unit consisting of one positive lens element and by reducing the number of lens elements up to 8 to 11 which numbers are common for three-unit lens systems. Zooming is performed by independently moving the above-mentioned negative and positive units. However, the essential weak point of this four-unit zoom lens is that, since chromatic aberration correction is not completed in each of the second and third lens units which independently move, it is impossible to sufficiently restrain a variation in chromatic aberration at a high zoom ratio due to a variation in relative position of each lens unit during zooming. In this example, restriction of the variation in chromatic aberration is managed by contriving an optimal power arrangement; however, it is quite difficult to realize 6× magnification in this zoom lens system.

Japanese Laid-open Patent Application No. H1-185608 realizes a 6× magnification zoom lens system by reducing the number of lens elements of the zoom lens system of Japanese Laid-open Patent Application No. S64-91110 by using aspherical surfaces. That is, this is a zoom lens system where the second lens unit of the zoom lens system of Japanese Laid-open Patent Application No. S64-91110 consists of one single negative lens element, the third lens unit thereof consists of one single positive lens element and the fourth lens element thereof is also simplified. In this lens system, however, since the above-mentioned variation in chromatic aberration is large, remaining chromatic aberration is still large although the power arrangement is carefully chosen, and consequently, it is difficult to realize the currently-demanded performance. Further, since chromatic aberration correction is attached a considerable amount of importance to in choosing an optimal power arrangement, the movement amounts of the second and third lens units which are movable lens units are quite large. As a result, the total length of the zoom lens system increases. In addition, since the diameter of the front lens element which has a great influence on the weight of the entire lens system is quite large compared to existing typical ones of the same specification, this zoom lens system is inferior from the viewpoint of the realization of compactness. As described above, the zoom lens system proposed by Japanese Laid-open Patent Application No. H1-185608 does not meet the current needs in compactness and chromatic aberration performance, although it achieves an object of reducing the number of lens elements.

Further, Japanese Laid-open Patent Application No. H2-39011 discloses a four-unit zoom lens system having a positive, negative, positive, positive configuration where chromatic aberration can be restrained similarly to the zoom lens system of Japanese Laid-open Patent Application No. H1-185608. In this zoom lens system, three aspherical surfaces are employed, and a 6× magnification zoom lens system having an F number of F 1.4 is realized with eight lens elements. It appears that the possibility of realizing the currently-demanded performance is stronger in cost, performance and size than the above-mentioned prior arts. However, there sill remain some problems: since the diameter of the front lens element is not sufficiently small, the zoom lens system has no considerable advantage in weight over conventional ones; and since coma in a sagittal direction which hardly appears in a graphic representation of aberrations is very large, deterioration of off-axial performance is large.

Japanese Laid-open Patent Application No. S54-30855, Japanese Laid-open Patent Application No. S54-80143 and Japanese Laid-open Patent Application No. H2-39116 propose zoom lens systems for use in single-lens reflex cameras and compact cameras. They are three-unit zoom lens systems having a positive, negative, positive configuration where high zoom ratios are realized by reducing the number of lens elements by moving each lens unit. The zoom ratio and the number of lens elements of the three prior arts are respectively 2.4× magnification and 10 lens elements, 3× magnification and 11 lens elements, and 3× magnification and 12 lens elements. The zoom ratios are insufficient, and since the second and third lens units are not sufficiently simplified, the costs are not satisfactorily reduced.

SUMMARY OF THE INVENTION

An object of the present invention is to provide a compact, high-performance zoom lens system having a zoom ratio of approximately 8× and an F number of approximately 1.6, and realized with fewer lens elements.

BRIEF DESCRIPTION OF THE DRAWINGS

This and other objects and features of this invention will become clear from the following description, taken in conjunction with the preferred embodiments with reference to the accompanied drawings in which:

FIG. 2A to 2C are graphic representations of aberrations of the first embodiment of the present invention;

FIG. 9 is a cross-sectional view showing a lens arrangement of a fifth embodiment of the present invention;

FIG. 11 is a cross-sectional view showing a lens arrangement of a sixth embodiment of the present invention;

FIG. 13 is a cross-sectional view showing a lens arrangement of a seventh embodiment of the present invention;

DESCRIPTION OF THE PREFERRED EMBODIMENTS

Figure 1:
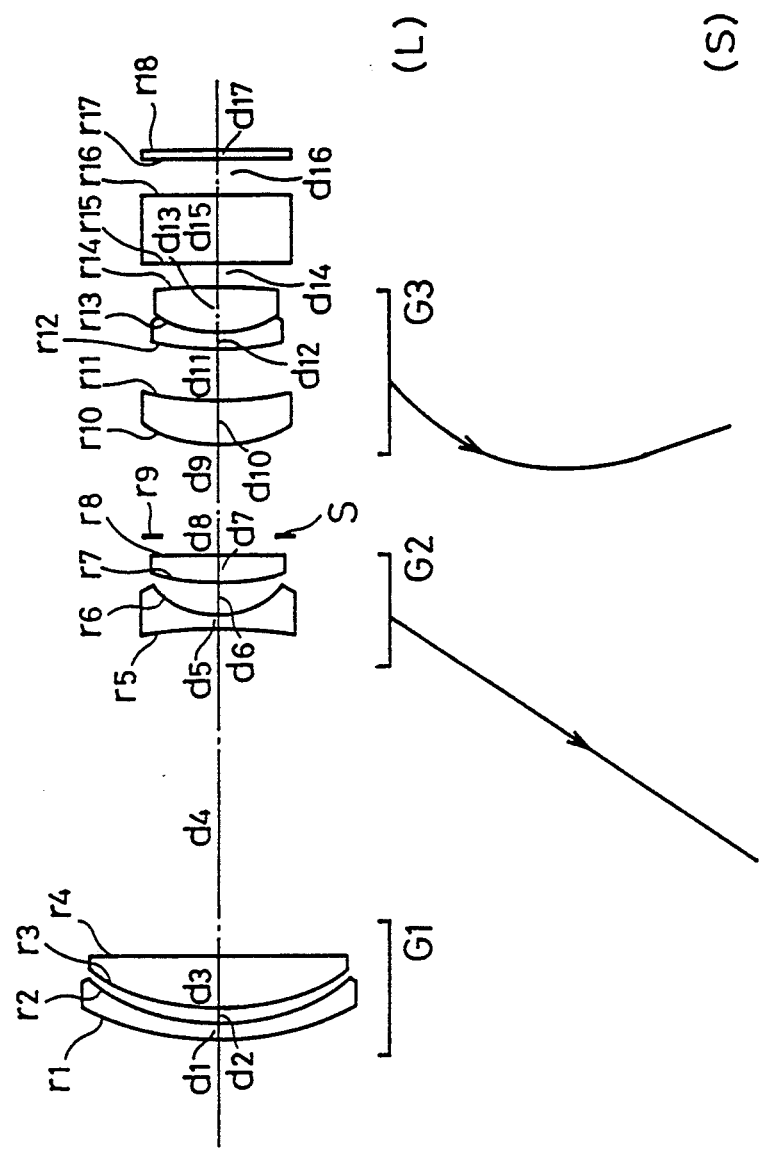
FIG. 1 is a cross-sectional view showing a lens arrangement of a first embodiment of the present invention.

As is understood from the above-described prior arts, no existing three-unit zoom lens systems have realized a zoom ratio of 8×; only zoom lens systems having four or more lens units have realized a zoom ratio of 8×. That is, it has been believed that the maximum zoom ratio for zoom lens systems having not more than three lens units is at most 3×. From the viewpoint of the number of lens elements and size, it is obvious that three-unit systems have an advantage over four-unit systems. From the viewpoint of aberration correction, however, it has long been believed that appropriate power and lens arrangements cannot be realized in three-unit zoom lens systems. This belief appears to apply, with a considerable exactitude, to zoom lens systems having only spherical surfaces. Regarding zoom lens systems which include aspherical surfaces as slight improvements of the zoom lens systems which have only spherical surfaces, it is understood that the fact that the above-mentioned brief is still applied is one of the reasons why no three-unit zoom lens systems having a zoom ratio of 8× have been realized up to date. However, it is obvious from aberration theory that a lens system exists which is not a mere improvement of a zoom lens system having only spherical surfaces but a zoom lens system which cannot be realized until aspherical surfaces are employed.

To achieve the above-mentioned object, a first implementation of the present invention comprises from the object side a first lens unit having a positive refractive power, a second lens unit having a negative refractive power and a third lens unit having a positive refractive power. The second lens unit is movable backward and forward along the optical axis during zooming. The third lens unit is movable backward and forward along the optical system to correct the image plane shift caused by the zooming. The first lens unit is provided with at least two lens elements including at least one negative lens element made of a high dispersion material. The second lens unit is provided with two lens elements including one positive lens element made of a high dispersion material. The third lens unit is provided with at least two lens elements including at least one negative lens element made of a high dispersion material. Further, the following conditions (1) to (6) are fulfilled:

$$\nu 1N < 30 \quad (1)$$
$$\nu 2P < 30 \quad (2)$$
$$\nu 3N < 30 \quad (3)$$
$$0.10 \leq fS \cdot \phi 1 \leq 0.15 \quad (4)$$
$$11.890 < |\phi 2| \cdot Z^2 \cdot Y' < 18.649 \quad (5)$$

-continued
$$83.401 < \frac{|\phi 2|}{\phi 1} \cdot \frac{Y'}{fS} \cdot Z^2 < 121.791 \quad (6)$$

where:
- $\nu 1N$ is an Abbe number of the negative lens element made of a high dispersion material, included in the first lens unit;
- $\mu P2$ is an Abbe number of the positive lens element made of a high dispersion material, included in the second lens element;
- $\nu N3$ is an Abbe number of the negative lens element made of a high dispersion material, included in the third lens unit;
- $fS$ is a focal length at the WIDE limit;
- $\phi 1$ is a refractive power of the first lens unit;
- $\phi 2$ is a refractive power of the second lens unit;
- $Z$ is a zoom ratio; and
- $Y'$ is an image height.

The conditions (1) to (3) relate to chromatic aberration correction in each lens unit. In zoom lens systems, regardless of their lens types, it is necessary that chromatic aberration be corrected in each lens unit. This is because the relative position of each lens unit largely shifts during zooming. If chromatic aberration correction in each lens unit is not made or is insufficient, chromatic aberration largely varies during zooming. As a result, the demanded performance cannot be realized. This tendency increases as the zoom ratio increases. In zoom lens systems having a zoom ratio of 8× or more, it is required that chromatic aberration be always appropriately corrected. When the Abbe numbers exceed the upper limit of the conditions (1) to (3), it is impossible to sufficiently correct chromatic aberration in each lens unit. As a result, variation in chromatic aberration during zooming exceeds the maximum permissible amount.

The condition (4) defines the refractive power of the first lens unit. In three-unit zoom lens systems of a positive, negative and positive configuration, the refractive power of the first lens unit decides the movement amount of the second lens unit, the diameter of the front lens element, the locus of the movement of the third lens unit and the total length of the lens system. When the refractive power of the first lens unit decreases and the lower limit of the condition (4) is exceeded, the movement amount of the second lens unit remarkably increases and the diameter of the front lens element increases. As a result, it is impossible to realize a compactness. When the refractive power of the first lens unit increases and the upper limit of the condition (4) is exceeded, although the diameter of the front lens element decreases, the total length is not reduced since the movement amount of the third lens unit increases, and the demanded performance cannot be realized since aberrations generated in the first lens unit increases. In particular, relating to zoom lens systems having a zoom ratio of 8× or more, the upper limit of the condition (4) is about the limit of performance correction.

The condition (5) defines an appropriate range of the refractive power of the second lens unit. When the second lens unit is provided with two lens elements, if the absolute value of the refractive power of the second lens unit increases and the upper limit of the condition (5) is exceeded, aberration generated in the second lens unit increases, so that variation in aberration remarkably increases during zooming. As a result, it is impossible to obtain excellent performance in the entire focal length range. Moreover, since the locus of the movement of the third lens unit is located at the most object side in the vicinity of and at the TELE limit (longest focal length condition), it is necessary to increase the distance between the second and third lens units. As a result, spherical aberration and field curvature, in particular, at the WIDE limit (shortest focal length condition) cannot be corrected. If the refractive power of the second lens unit decreases and the lower limit of the condition (5) is exceeded, the movement amount of the second lens unit remarkably increases, so that the total length of the lens system and the diameter of the front lens element enormously increase. As a result, the size and weight cannot be reduced.

The condition (6) defines an appropriate balance of the refractive powers of the first and second lens units. When the second lens unit is provided with two lens elements, if the refractive power of the second lens unit becomes large compared to that of the first lens unit and the upper limit of the condition (6) is exceeded, the locus of the movement of the third lens unit is located at the most object side in the vicinity of and at the TELE limit, so that it is necessary to increase the distance between the second and third lens units similarly to the above-mentioned case. As a result, a sufficient WIDE limit performance cannot be secured. Furthermore, the total length of the lens system is not reduced at all. If the refractive power of the first lens unit becomes large compared to that of the second lens unit and the lower limit of the condition (6) is exceeded, the locus of the movement of the third lens unit hardly shows any U-turns and the movement amount of the third lens unit considerably increases, so that the total length of the lens system remarkably increases. As a result, a required compactness cannot be obtained.

A second implementation of the present invention, where a second lens unit includes at least three lens elements (preferably, three or four), comprises from the object side a first lens unit having a positive refractive power, a second lens unit having a negative refractive power and a third lens unit having a positive refractive power. The second lens unit is movable backward and forward along the optical axis during zooming. The third lens unit is movable backward and forward along the optical axis to correct the image plane shift caused by the zooming. The first lens unit is provided with at least two lens elements including at least one negative lens element made of a high dispersion material. The second lens unit is provided with at least three lens elements including at least one positive lens element made of a high dispersion material. The third lens unit is provided with at least two lens elements including at least one negative lens element made of a high dispersion material. The above-mentioned conditions (1) to (4) and the following conditions (7) and (8) are fulfilled:

$$28.5 < |\phi 2| \cdot Z^2 \cdot Y < 47.5 \quad (7)$$

$$194.75 < \frac{|\phi 2|}{\phi 1} \cdot \frac{Y}{f_S} \cdot Z^2 < 285 \quad (8)$$

The conditions (1) to (3) relate to chromatic aberration correction similarly to the above-described first implementation. The condition (4) defines the refractive power of the first lens unit similarly to the above-described first implementation.

The condition (7) defines an appropriate range of the refractive power of the second lens unit. As the second lens unit is provided with three or more lens elements, the optimal power arrangement is different from that of the first implementation since the principal point of each lens unit is different, and the appropriate range of the refractive power of the second lens unit is consequently different from the condition (5). Moreover, the performance to correct aberrations differs depending on the number of lens elements. When the absolute value of the refractive power of the second lens unit increases and the upper limit of the condition (7) is exceeded, more aberrations are generated in the second lens element, so that variation in aberration during zooming is large. As a result, it is impossible to obtain excellent performance in the entire focal length range. Further, since the locus of the movement of the third lens unit is located at the most object side in the vicinity of and at the TELE limit, it is necessary to increase the distance between the second and third lens units. As a result, it is impossible to sufficiently correct spherical aberration and field curvature at the WIDE limit. When the absolute value of the refractive power of the second lens unit decreases and the lower limit of the condition (7) is exceeded, the movement amount of the second lens unit increases, so that the total length of the lens system and the diameter of the front lens element remarkably increase. As a result, the size and weight cannot be reduced.

The condition (8) defines an appropriate balance of the refractive powers of the first and second lens units. As the second lens unit is provided with three or more lens elements, similarly to the condition (7), the optimal power arrangement is different from that of the first implementation since the principal point of each lens unit is different, and the appropriate balance of the refractive powers of the first and second lens units is consequently different from the condition (6). When the refractive power of the second lens unit becomes large compared to that of the first lens unit and the upper limit of the condition (8) is exceeded, the locus of the movement of the third lens unit is located at the most object side in the vicinity of and at the TELE limit, so that it is necessary to increase the distance between the second and third lens units. As a result, it is impossible to sufficiently correct aberrations at the WIDE limit. When the refractive power of the first lens unit becomes large compared to that of the second lens unit and the lower limit of the condition (8) is exceeded, the locus of the movement of the third lens unit hardly shows any U-turns and the movement amount of the third lens unit remarkably increases. As a result, the total length of the lens system remarkably increases.

Further, the third lens unit preferably includes four lens elements consisting of from the object side two positive lens elements, one negative lens element and one positive lens element and that at least one aspherical surface be employed for the positive lens elements.

In three-unit lens systems having a positive, negative, positive configuration, the lens unit which most requires aberration correcting performance is the third lens unit. This is because the third lens is required to correct the bias component of the aberrations generated in the first and second lens units and to correct aberrations generated in the third lens unit itself. In each of the first and second lens units, chromatic aberration and spherical aberration are nearly sufficiently corrected in order to minimize the variation in aberration during zooming. However, satisfactory performance of the entire lens system is not guaranteed by only restraining variation in aberration; it is necessary to correct the bias component as well as the variation in aberration. Since the bias component hardly changes during zooming, they can be corrected with comparatively small number of lens elements by effectively using aspherical surfaces. That is, aspherical surfaces can most effectively be used in the third lens unit, since light passes almost in the same manner in the entire focal length range. In order to realize by most effectively using aspherical surfaces a compact lens system which cannot be realized with only spherical surfaces, the above-mentioned lens arrangement is required. In addition, it is necessary to use at least one aspherical surface for one of the positive lens elements. It is most desirable to use the aspherical surface for the most image side positive lens element.

Alternatively, the third lens unit may be provided with three lens elements consisting of from the object side one positive lens element, one negative lens element and one positive lens element.

At least one aspherical surface must be used for either of the positive lens elements. It is preferable to use one aspherical surface for each of the most object side positive lens element and the most image side positive lens element.

The first lens unit preferably includes, in the first implementation, two lens elements consisting of from the object side a negative lens element concave to the image side and a positive lens element comparatively strongly convex to the object side, and in the second implementation, the first lens unit preferably includes three lens elements comprising from the object side a negative lens element concave to the image side and a positive lens element comparatively strongly convex to the object side.

It is very difficult to reduce the number of lens elements of the first lens unit; however, by selecting an appropriate range of the refractive power of the first lens unit as shown by the conditions (5) and (7), it ultimately becomes possible to construct the first lens unit with two lens elements as described above. At this time, the above-described lens arrangements of the first and second implementations are preferably used.

The second lens unit preferably includes, in the first implementation, two lens elements consisting of from the object side a negative lens element comparatively strongly concave to the image side and a positive lens element, and in the second implementation, the second lens unit preferably includes at least three lens elements comprising a negative lens comparatively strongly concave to the image side and a positive lens.

Similarly to the case of the first lens unit, it is very difficult to reduce the number of lens elements of the second lens unit; however, by selecting an appropriate ratio between the refractive powers of the first and second lens units as shown by the conditions (6) and (8), it ultimately becomes possible to construct the second lens unit with two lens elements as described above. At this time, the above-described lens arrangements of the first and second implementations are preferably used.

By employing for a camera body the above-described zoom lens system of the present invention, it is possible to reduce the size and cost of the camera with maintaining a high performance.

Numerical data of first to ninth embodiments of the present invention are shown in Tables 1 to 9, respectively. In each table:

ri (i=1, 2, 3, ...) represents a radius of curvature of an ith lens surface counted from the object side;
di (i=1, 2, 3, ...) represents an ith axial distance counted from the object side;
Ni (i=1, 2, 3, ...) represents a refractive index to the d-line, of an ith lens counted from the object side;
νi (i=1, 2, 3, ...) represents an Abbe number to the d-line, of an ith lens counted from the object side; and
f represents a focal length of the entire lens system.

In the tables, the asterisks show that the surfaces are aspherical. The aspherical surfaces are defined by the following equation:

$$X = \frac{C \cdot Y^2}{1 + \sqrt{1 - \epsilon \cdot Y^2 \cdot C^2}} + \sum_i A_i Y^i$$

where:
X is a distance from the vertex of the surface, along the optical axis;
Y is a height in a direction perpendicular to the optical axis;
C is a Curvature;
$\epsilon$ is a conic constant; and
$A_i$ is an ith aspherical coefficient.

Table 10 shows values of ν1N of the condition (1), values of ν2P of the condition (2) and values of νN3 of the condition (3) in the first to ninth embodiments. Table 11 shows values of fS·φ1 of the condition (4), values of $|\phi2| \cdot Z^2 \cdot Y'$ of the conditions (5) and (7) and values of $(|\phi2|/\phi1) \cdot (Y'/fS) \cdot Z^2$ of the conditions (6) and (8).

Figure 3:
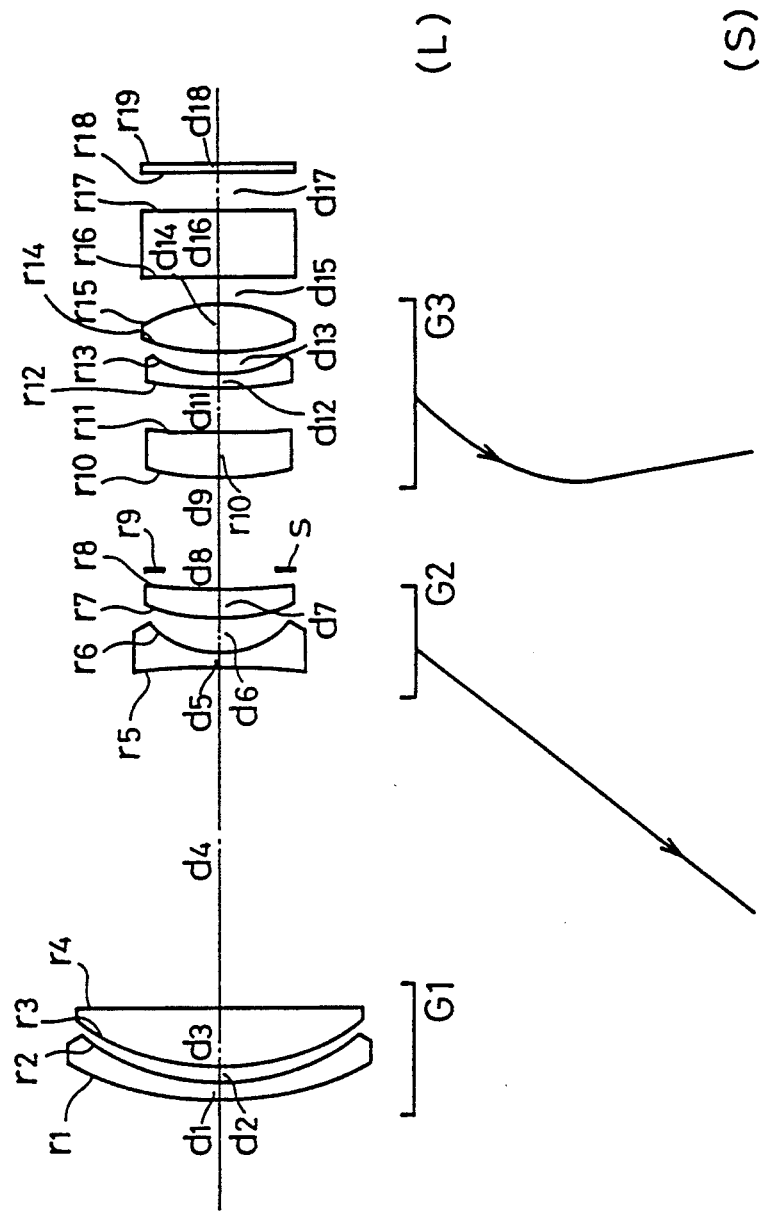
FIG. 3 is a cross-sectional view showing a lens arrangement of a second embodiment of the present invention.
Figure 5:
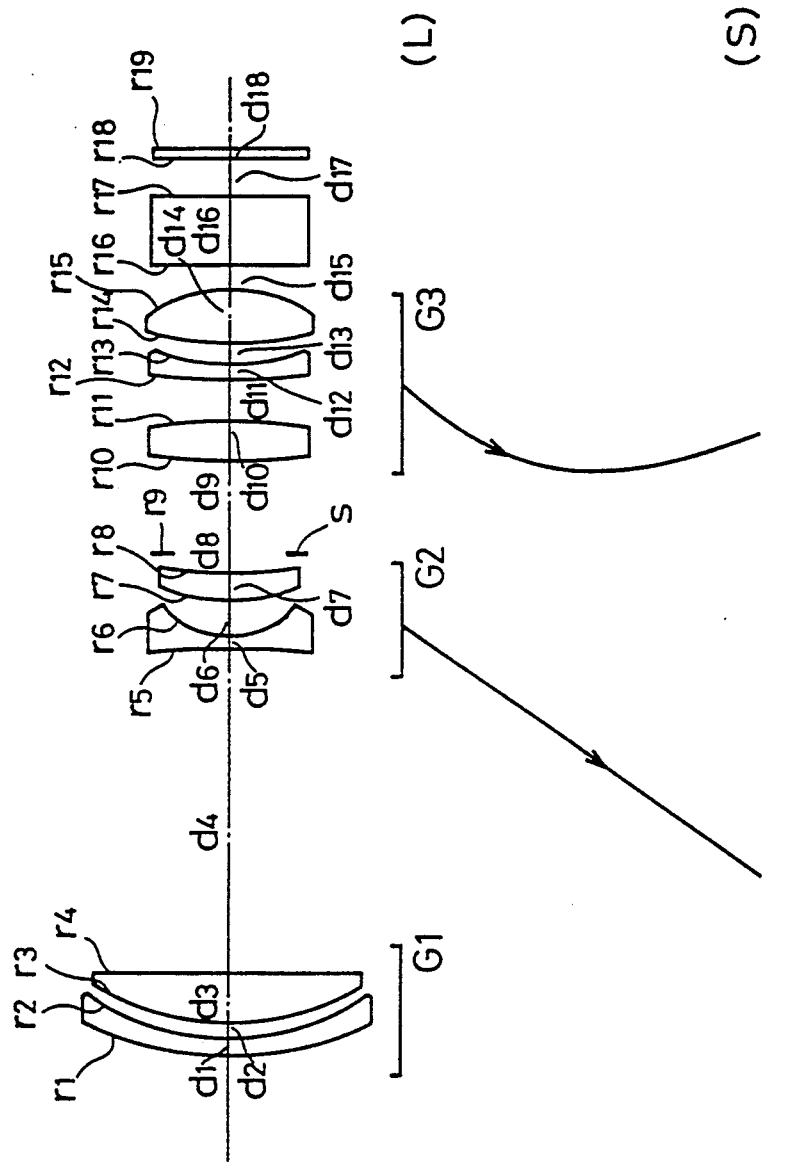
FIG. 5 is a cross-sectional view showing a lens arrangement of a third embodiment of the present invention.
Figure 7:
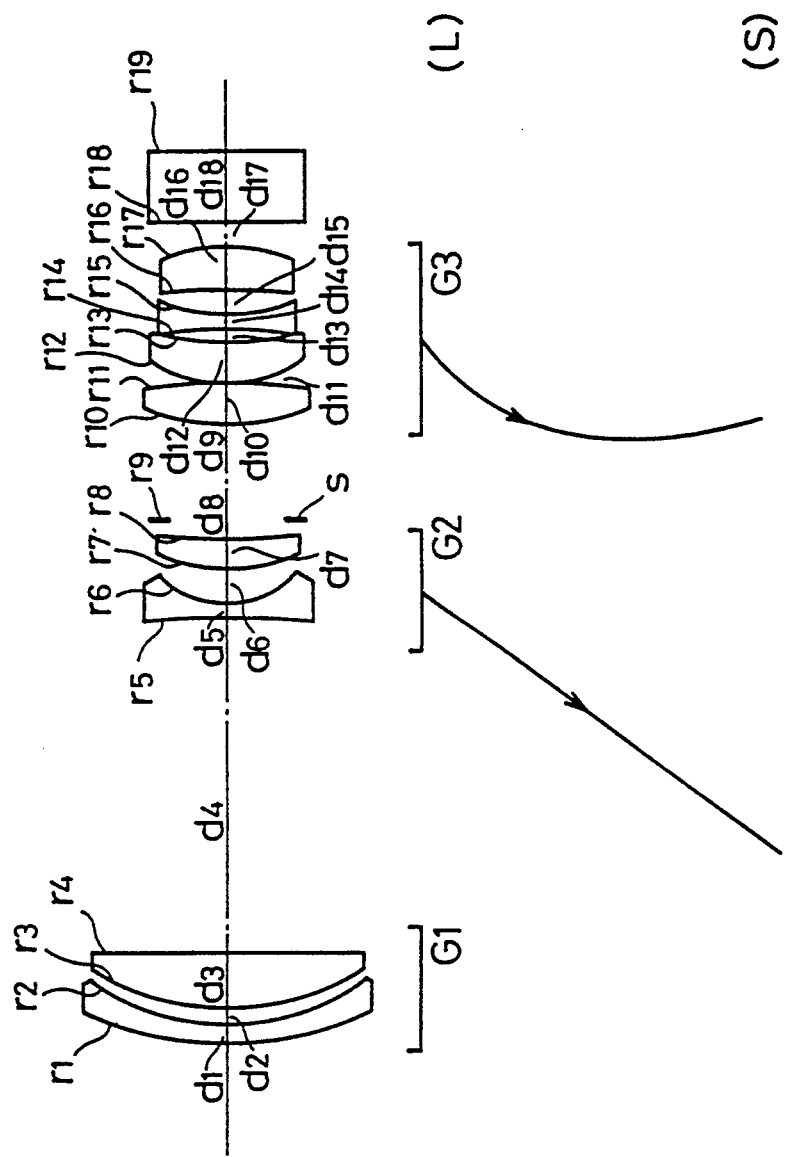
FIG. 7 is a cross-sectional view showing a lens arrangement of a fourth embodiment of the present invention.
Figure 15:
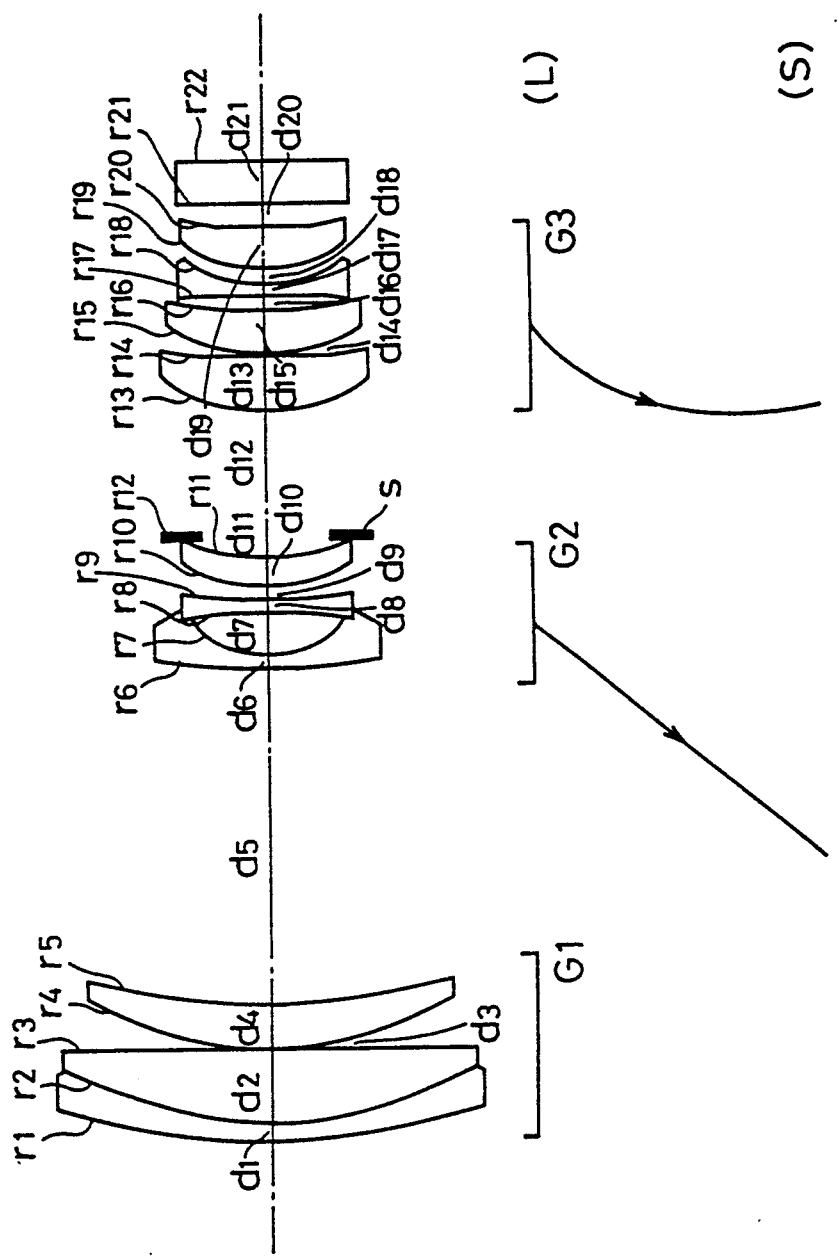
FIG. 15 is a cross-sectional view showing a lens arrangement of an eighth embodiment of the present invention.
Figure 17:
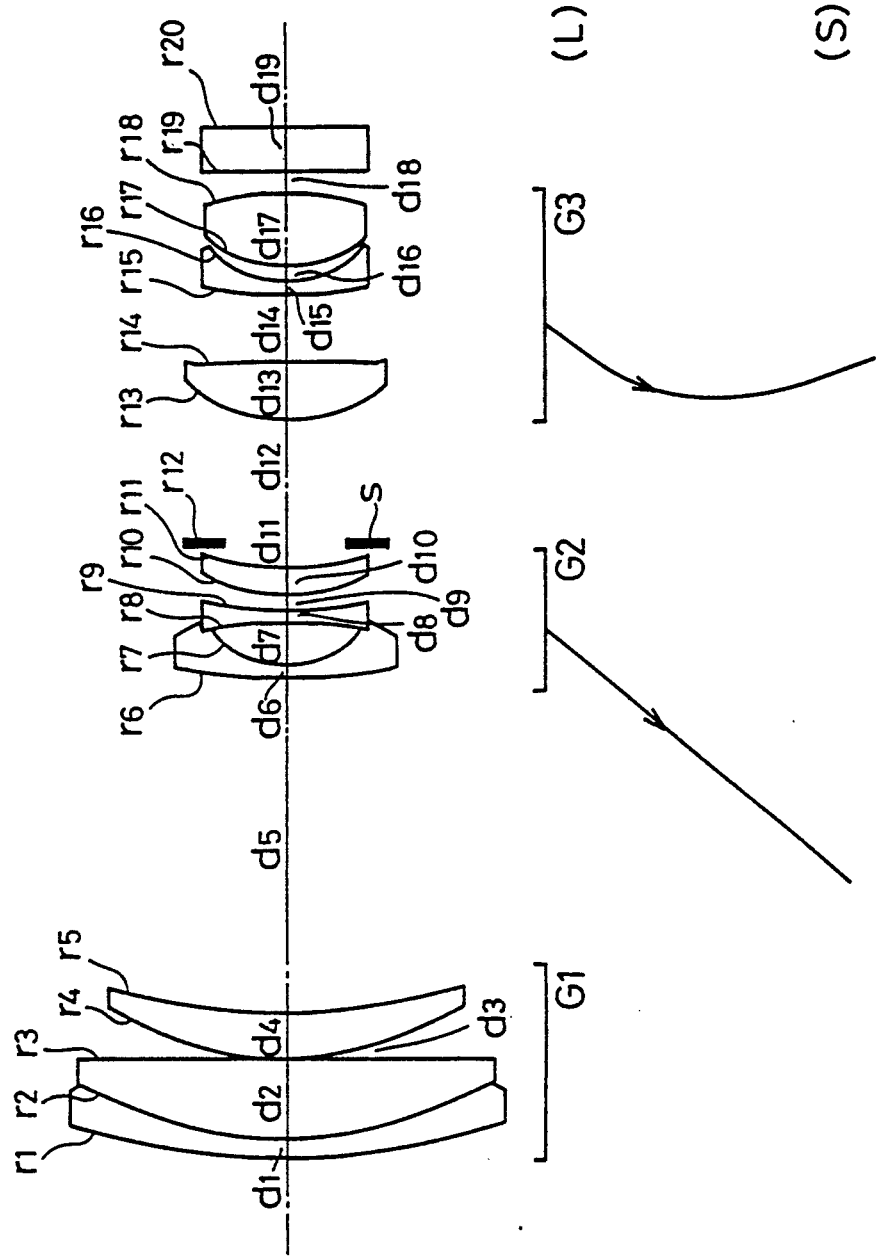
FIG. 17 is a cross-sectional view showing a lens arrangement of a ninth embodiment of the present invention.

FIGS. 1, 3, 5, 7, 9, 11, 13, 15 and 17 are cross-sectional views showing lens arrangements at the TELE limit (L), of the first to ninth embodiments of the present invention. In each figure, the arrows m1, m2 and m3 show movements of the first, second and third lens units G1, G2, and G3 from the TELE limit (L) to the WIDE limit (S), respectively. The first to sixth embodiments belong to the first implementation, while the seventh to ninth embodiments belong to the second implementation.

The first embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including a positive lens element convex to the object side and a doublet lens element consisting of a negative meniscus lens element concave to the image side and a positive bi-convex lens element; and two flat plates (for example, a low-pass filter and a face plate).

The object side surface of the positive meniscus lens element of the second lens unit G2, the object side surface of the positive lens element convex to the object side, of the third lens unit G3 and the image side surface of the positive bi-convex lens element of the third lens unit G3 are aspherical.

The second embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including a positive lens element convex to the object side, a negative meniscus lens element concave to the image side and a positive bi-convex lens element; and two flat plates (for example, a low-pass filter and a face plate).

The object side surface of the positive meniscus lens element of the second lens unit G2, the object side surface of the positive lens element convex to the object side, of the third lens unit G3 and the image side surface of the positive bi-convex lens element of the third lens unit G3 are aspherical.

The third embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including a positive bi-convex lens element, a negative meniscus lens element concave to the image side and a positive bi-convex lens element; and two flat plates (for example, a low-pass filter and a face plate).

The object side surface of the positive meniscus lens element of the second lens unit G2, the object side surface of the object side positive bi-convex lens element of the third lens unit G3 and the image side surface of the image side positive bi-convex lens element of the third lens unit G3 are aspherical.

The fourth embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including a positive bi-convex lens element, a positive meniscus lens element convex to the object side, a negative bi-concave lens element and a positive meniscus lens element convex to the image side; and one flat plate (for example, a low-pass filter or a face plate).

The object side surface of the positive meniscus lens element of the second lens unit G2 and the image side surface of the positive meniscus lens element convex to the image side, of the third lens unit G3 are aspherical.

The fifth embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including a positive bi-convex lens element, a positive meniscus lens element convex to the object side, a negative bi-concave lens element and a positive bi-convex lens element; and one flat plate (for example, a low-pass filter or a face plate).

The object side surface of the positive meniscus lens element of the second lens unit G2 and the image side surface of the image side positive bi-convex lens element of the third lens unit G3 are aspherical.

The sixth embodiment comprises from the object side: a first lens unit G1 including a negative meniscus lens element concave to the image side and a positive meniscus lens element convex to the object side; a second lens unit G2 including a negative bi-concave lens element and a positive meniscus lens element convex to the object side; an aperture S; a third lens unit G3 including two positive meniscus lens elements convex to the object side, a negative meniscus lens element concave to the image side and a positive bi-convex lens element; and one flat plate (for example, a low-pass filter or a face plate).

The object side surface of the positive meniscus lens element of the second lens unit G2 and the image side surface of the image side positive bi-convex lens element of the third lens unit G3 are aspherical.

The seventh embodiment comprises from the object side: a first lens unit G1 including a doublet lens element consisting of a negative meniscus lens element concave to the image side and a positive meniscus lens element convex to the object side, and a positive meniscus lens element convex to the object side; a second lens unit G2 including a negative meniscus lens element concave to the image side, a negative bi-concave lens element and a positive meniscus lens element convex to the object side; an aperture S; a third lens unit G3 including a positive bi-convex lens element and a doublet lens element consisting of a negative meniscus lens element concave to the image side and a positive bi-convex lens element; and one flat plate (for example, a low-pass filter or a face plate).

The image side surface of the object side positive bi-convex lens element of the third lens unit G3 and the image side surface of the image side positive bi-convex lens element of the third lens unit G3 are aspherical.

The eighth embodiment comprises from the object side: a first lens unit G1 including a doublet lens element consisting of a negative meniscus lens element concave to the image side and a positive meniscus lens element convex to the object side, and a positive meniscus lens element convex to the object side; a second lens unit G2 including a negative meniscus lens element concave to the image side, a negative bi-concave lens element and a positive meniscus lens element convex to the object side; an aperture S; a third lens unit G3 including two positive meniscus lens elements convex to the object side, a negative bi-concave lens element and a positive meniscus lens element convex to the object side; and one flat plate (for example, a low-pass filter or a face plate).

The image side surface of the image side positive meniscus lens element convex to the object side, of the third lens unit G3 is aspherical.

The ninth embodiment comprises from the object side: a first lens unit G1 including a doublet lens element consisting of a negative meniscus lens element concave to the image side and a positive bi-convex lens element, and a positive meniscus lens element convex to the object side; a second lens unit G2 including a negative meniscus lens element concave to the image side, a negative bi-concave lens element and a positive meniscus lens element convex to the object side; an aperture S; a third lens unit G3 including a positive bi-convex lens element, a negative meniscus lens element concave to the image side and a positive bi-convex lens element; and one flat plate (for example, a low-pass filter or a face plate).

The image side surface of the object side positive bi-convex lens element of the third lens unit G3 and the image side surface of the image side positive bi-convex lens element of the third lens unit G3 are aspherical.

Figure 4A:
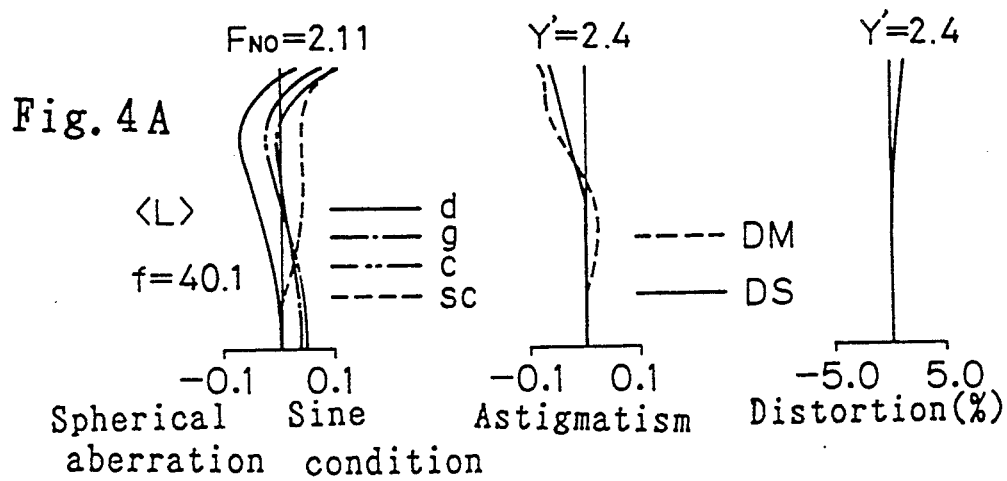
FIGS. 4A to 4C are graphic representations of aberrations of the second embodiment of the present invention.
Figure 4B:
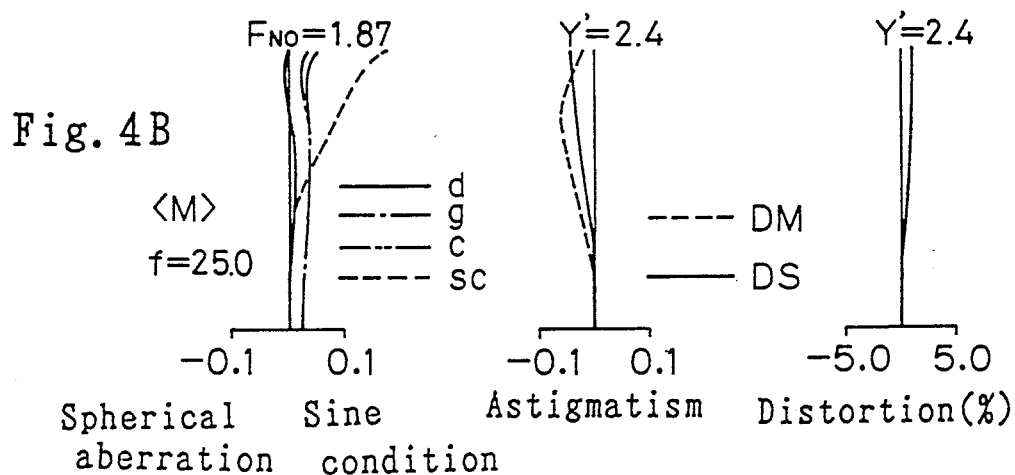
Figure 4C:
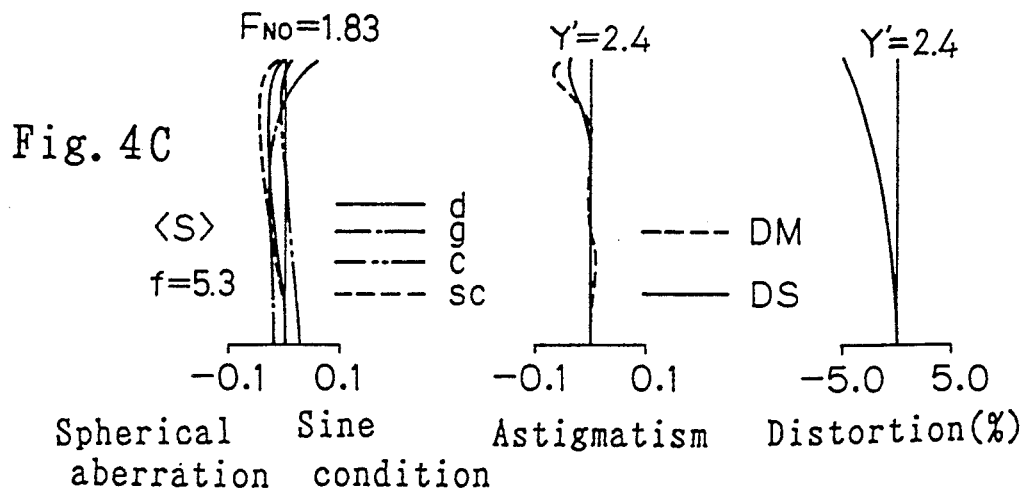
Figure 6A:
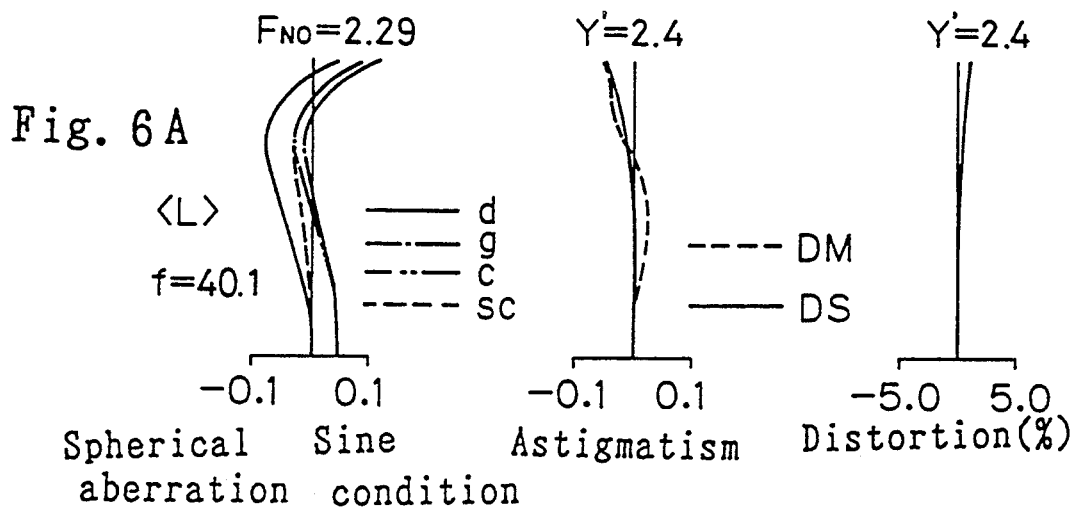
FIGS. 6A to 6C are graphic representations of aberrations of the third embodiment of the present invention.
Figure 6B:
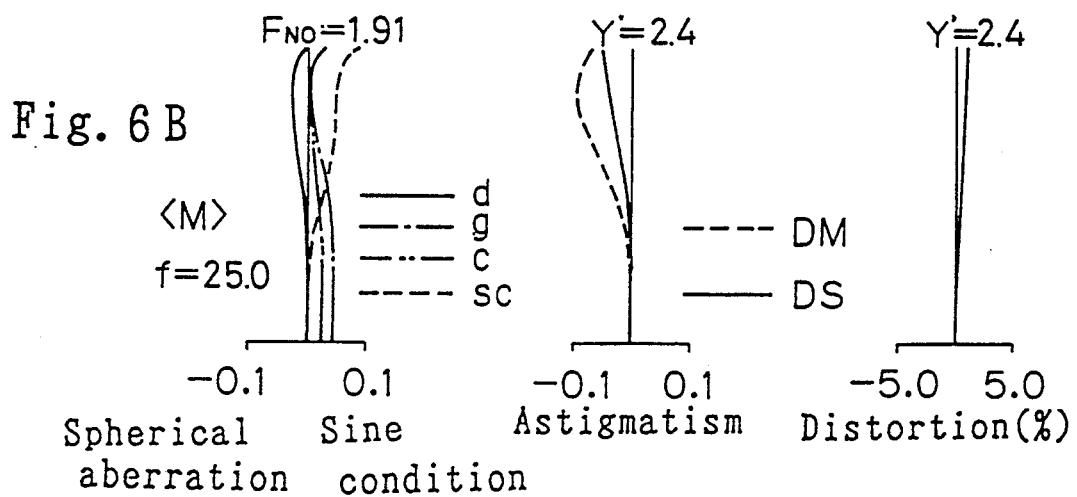
Figure 6C:
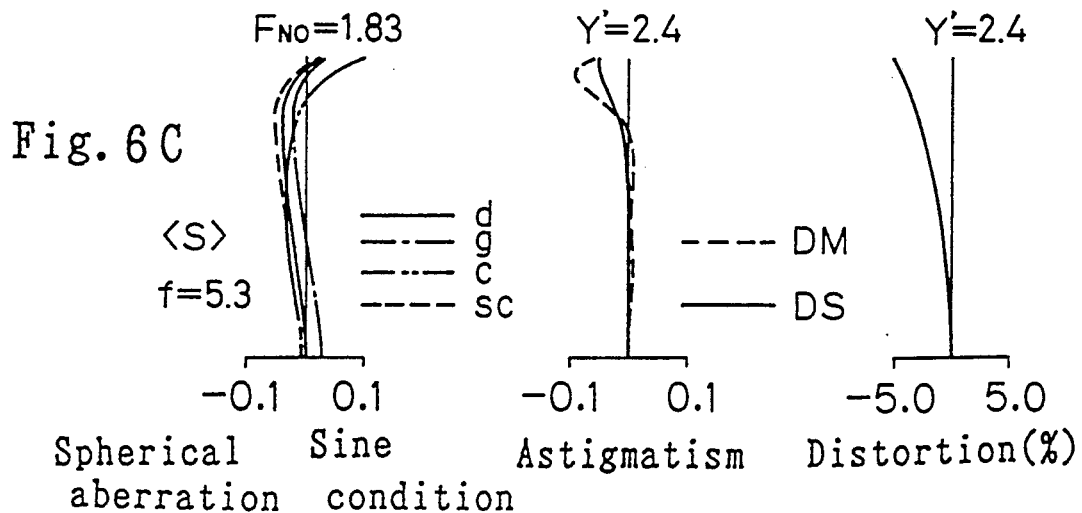
Figure 8A:
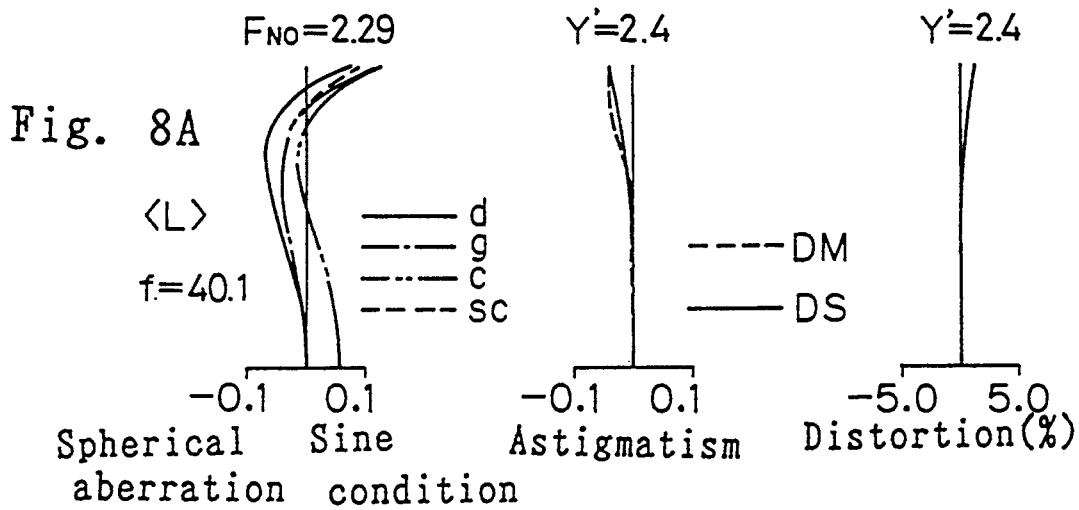
FIGS. 8A to 8C are graphic representations of aberrations of the fourth embodiment of the present invention.
Figure 8B:
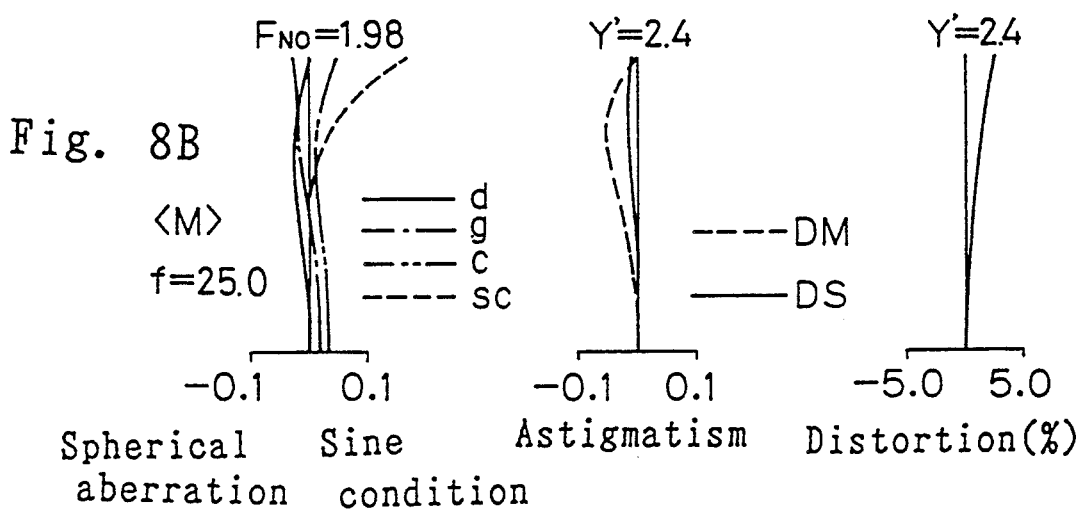
Figure 8C:
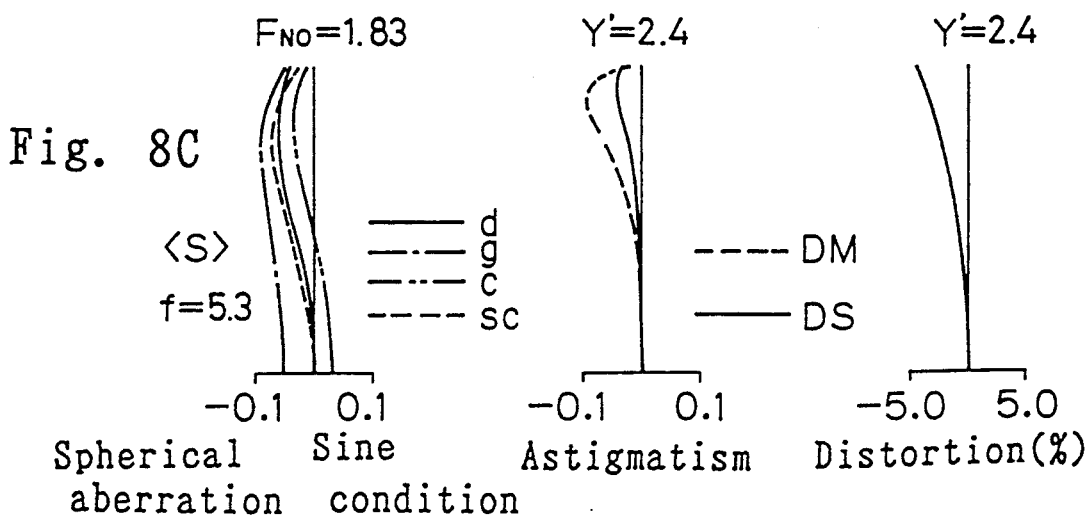
Figure 10A:
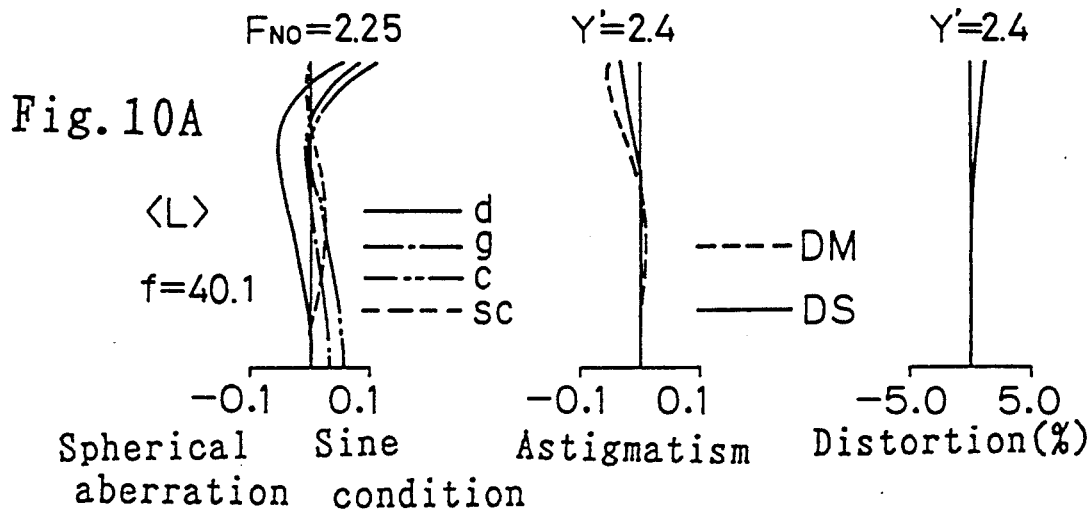
FIGS. 10A to 10C are graphic representations of aberrations of the fifth embodiment of the present invention.
Figure 10B:
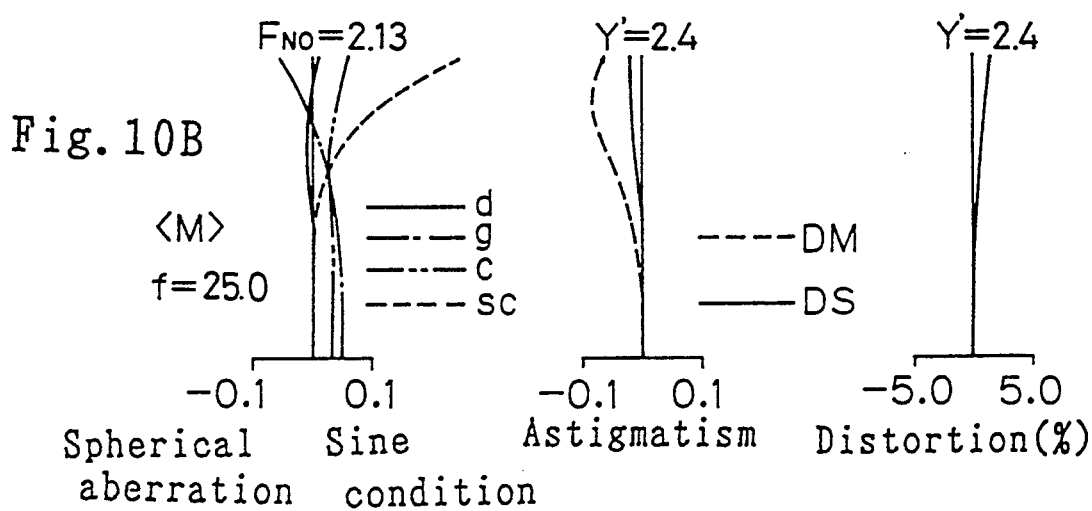
Figure 10C:
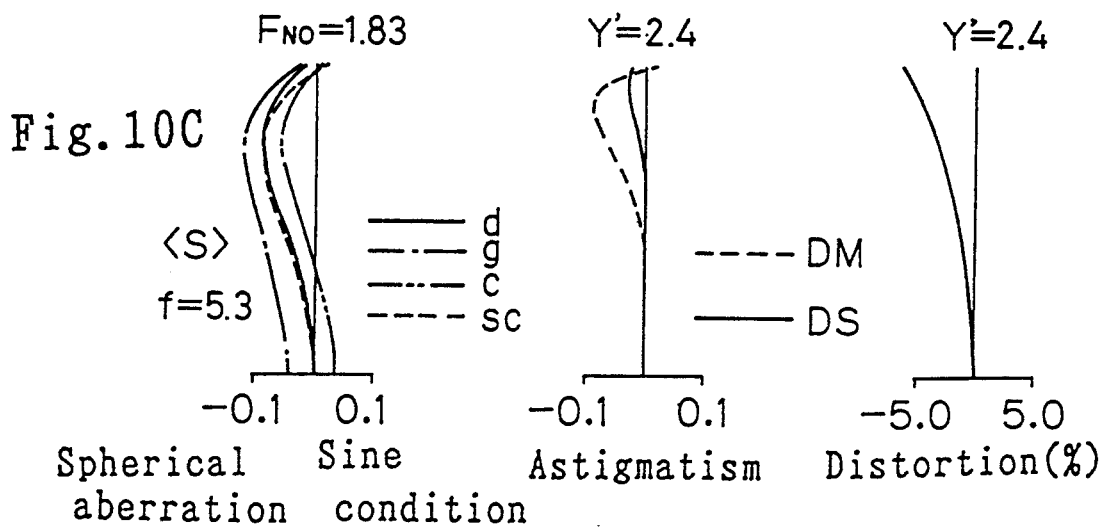
Figure 12A:
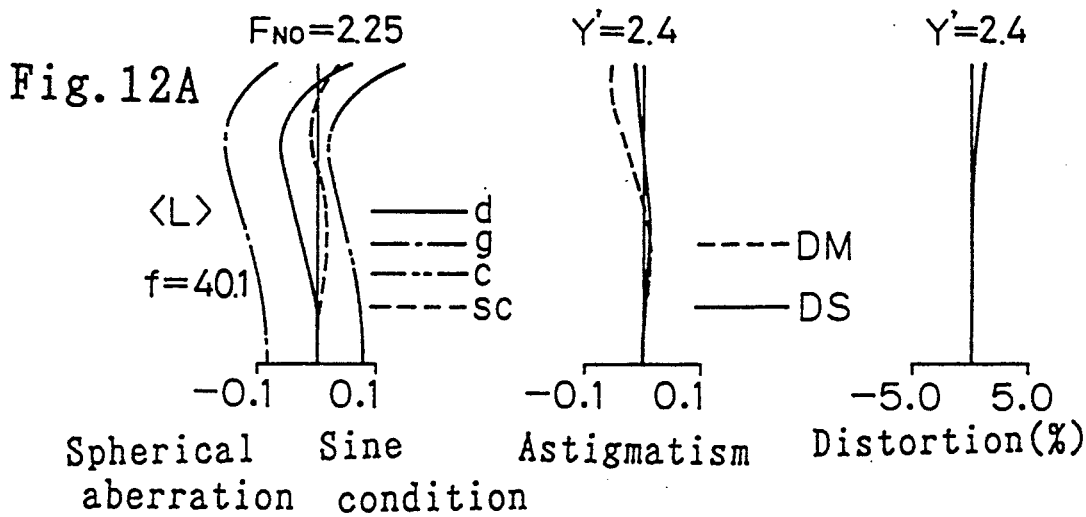
FIGS. 12A to 12C are graphic representations of aberrations of the sixth embodiment of the present invention.
Figure 12B:
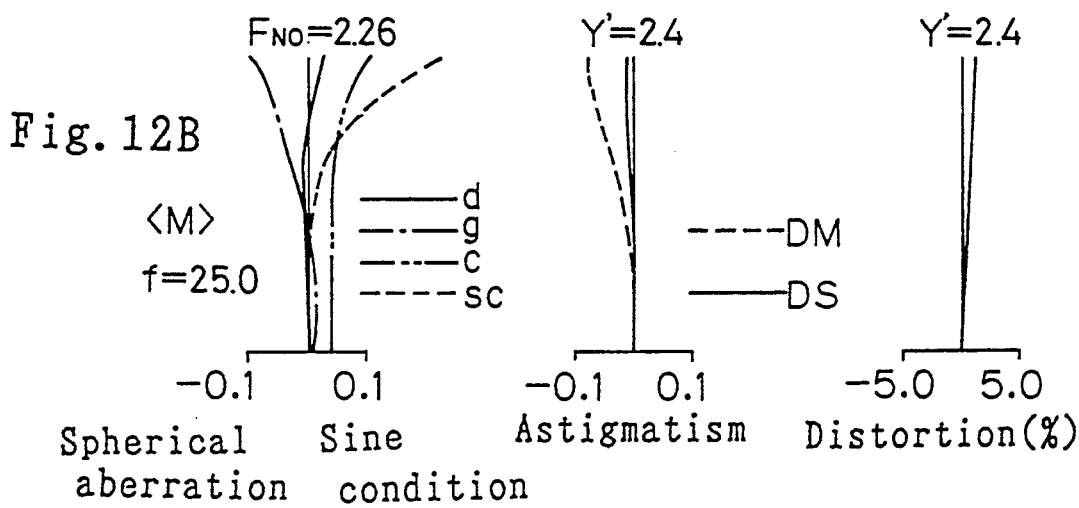
Figure 12C:
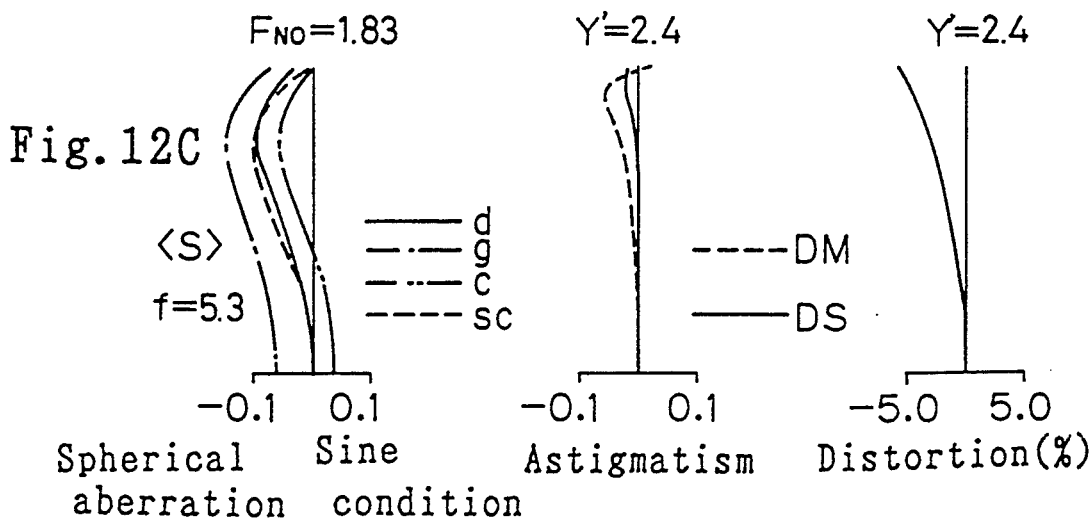
Figure 14A:
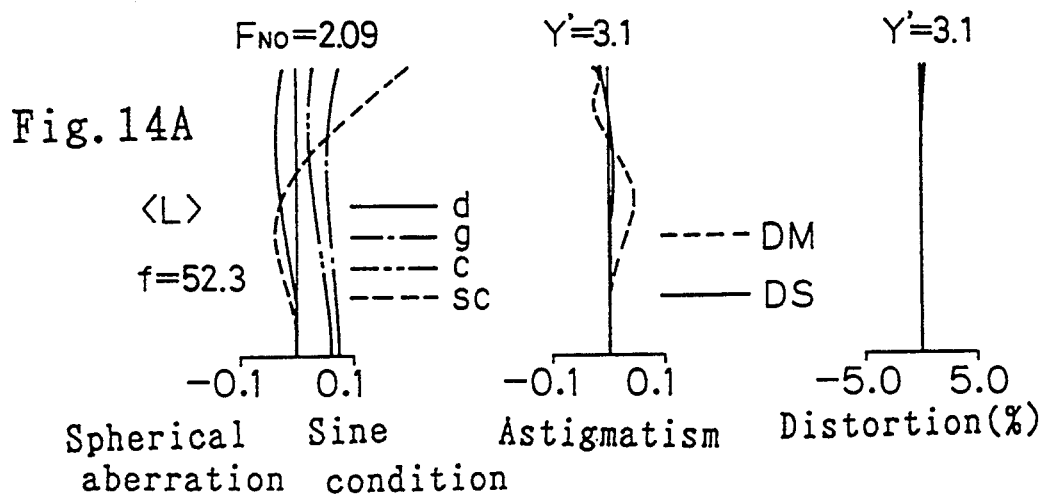
FIGS. 14A to 14C are graphic representations of aberrations of the seventh embodiment of the present invention.
Figure 14B:
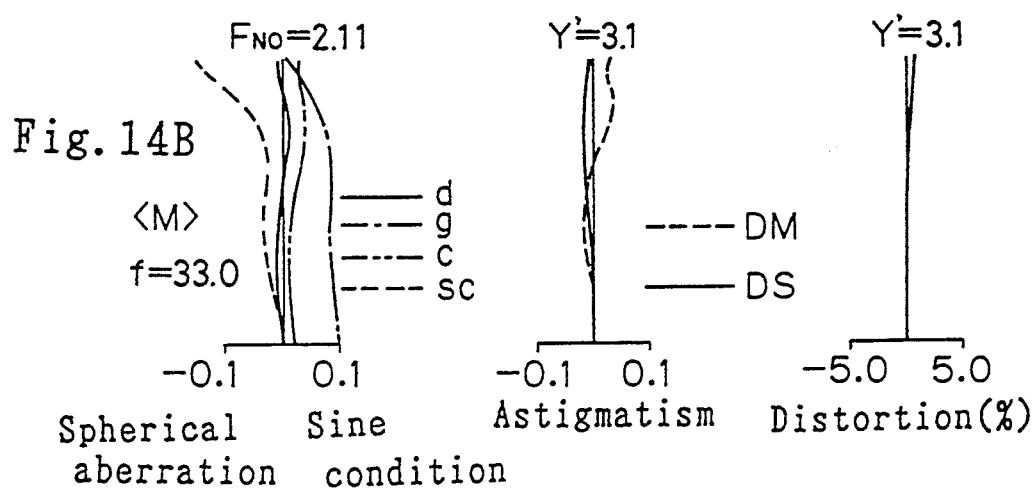
Figure 14C:
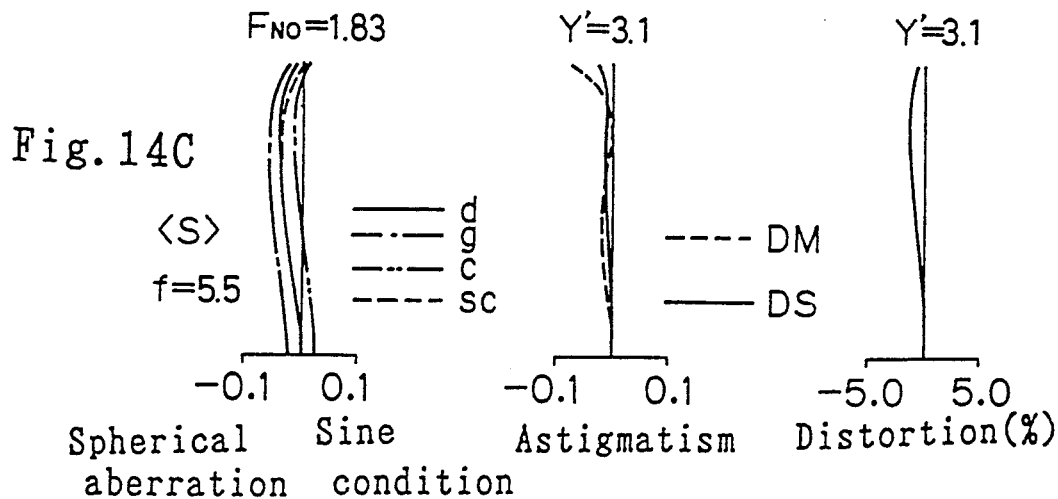
Figure 16A:
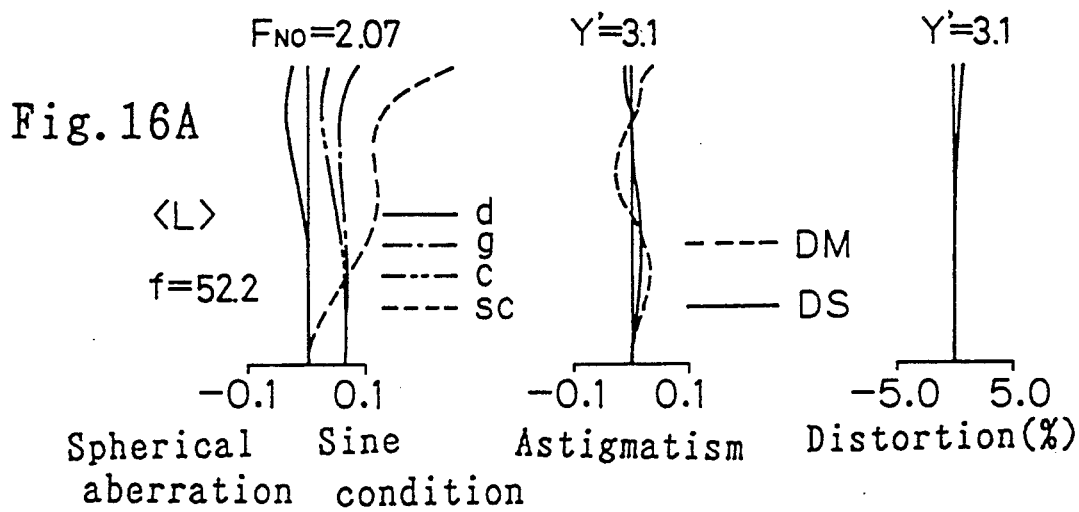
FIGS. 16A to 16C are graphic representations of aberrations of the eighth embodiment of the present invention.
Figure 16B:
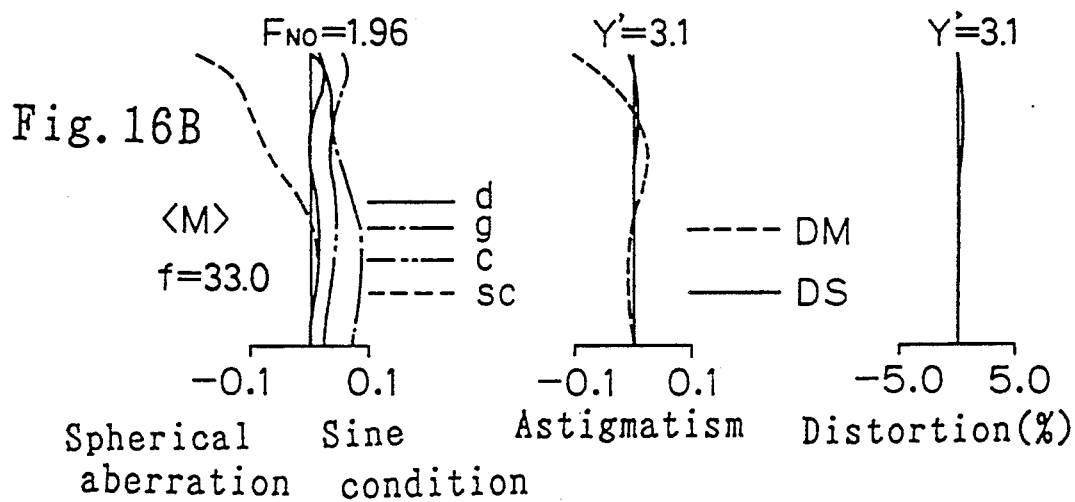
Figure 16C:
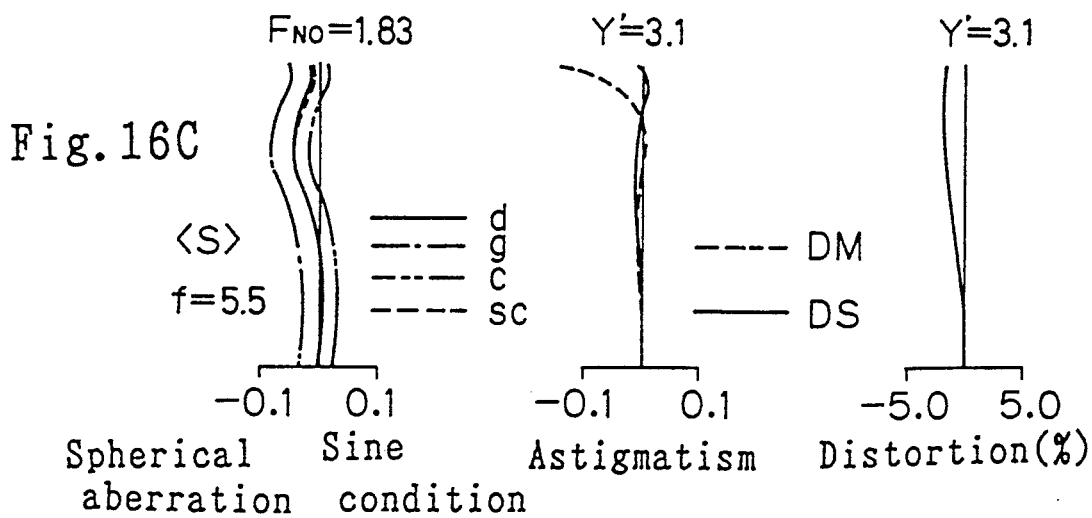
Figure 18A:
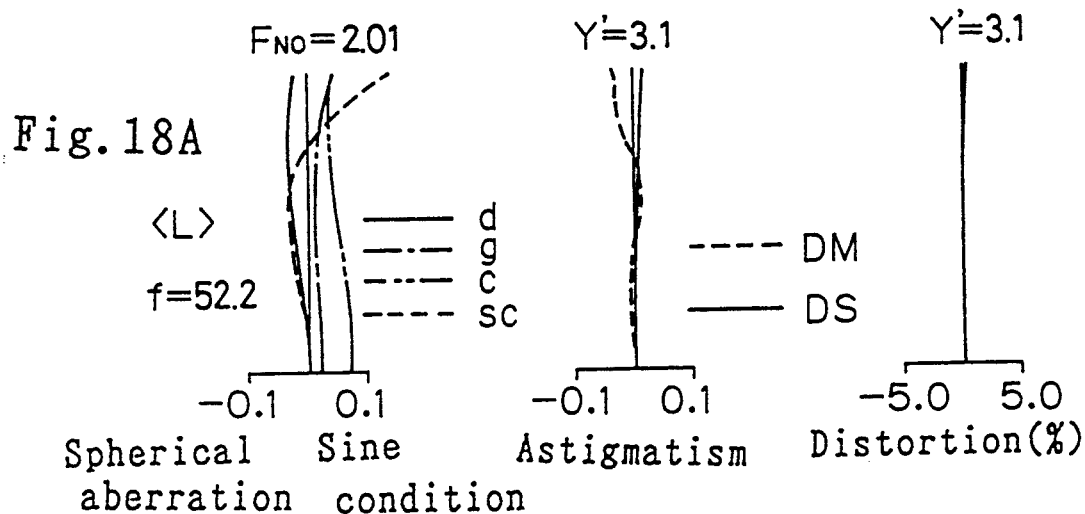
FIGS. 18A to 18C are graphic representations of aberrations of the ninth embodiment of the present invention.
Figure 18B:
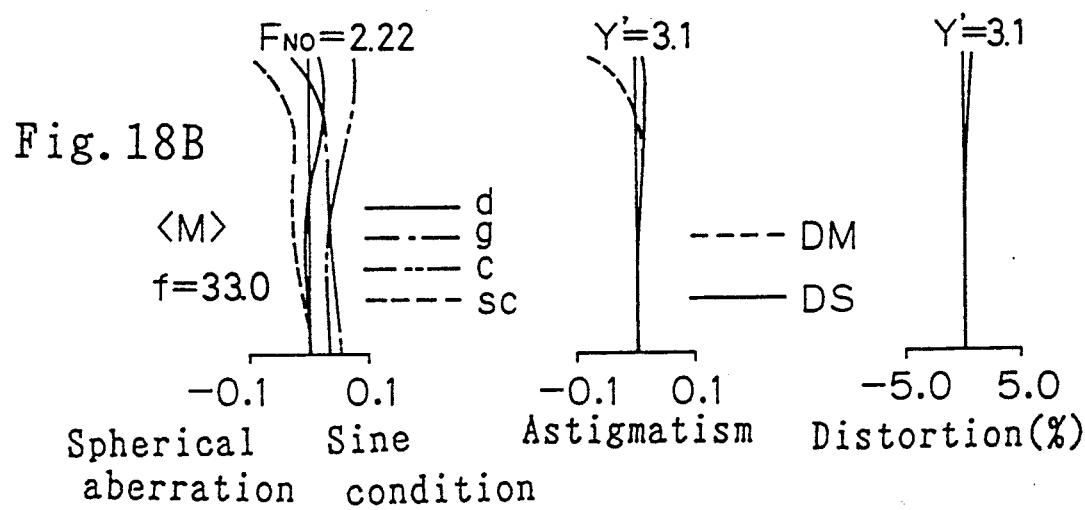
Figure 18C:
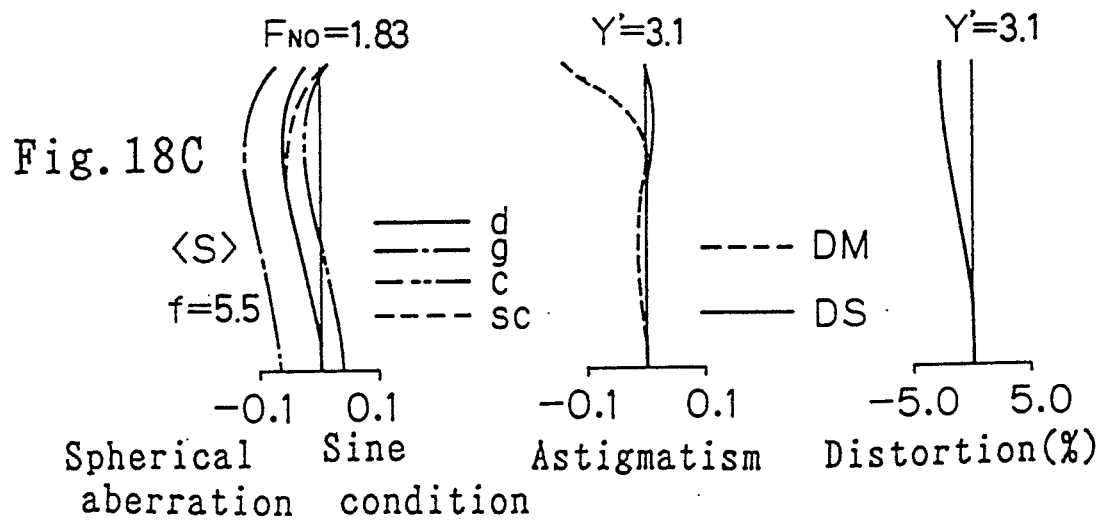

FIGS. 2A to 2C, 4A to 4C, 6A to 6C, 8A to 8C, 10A to 10C, 12A to 12C, 14A to 14C, 16A to 16C and 18A to 18C are graphic representations of aberrations of the first to ninth embodiments at the TELE limit <L>, at the middle focal length condition <M> and at the WIDE limit <S>, respectively.

A solid line d represents aberration to the d-line. A dash and dot line g represents aberration to g-line. A dash and two dots line c represents aberration to c-line. A dotted line SC represents a sine condition. Dotted lines DM and DS represent astigmatism on a meridional and a sagittal image planes, respectively.

Obviously, many modifications and variations of the present invention are possible in light of the above teachings. It is therefore to be understood that within the scope of the appended claims, the invention may be practiced other than as specifically described.

TABLE 1
(1st Embodiment)

f = 40.1 to 25.0 to 5.3

| Radius of Curvature | | Axial Distance | Refractive Index | | Abbe Number |
|---|---|---|---|---|---|
| r1 | 23.091 | | | | |
| | | d1 | 1.200 | N1 1.83350 | ν1 21.00 |
| r2 | 15.354 | | | | |
| | | d2 | 1.000 | | |
| r3 | 16.607 | | | | |
| | | d3 | 3.600 | N2 1.77250 | ν2 49.77 |
| r4 | 390.485 | | | | |
| | | d4 | 23.066 to 18.230 to 1.201 | | |
| r5 | −47.413 | | | | |
| | | d5 | 1.000 | N3 1.77250 | ν3 49.77 |
| r6 | 5.909 | | | | |
| | | d6 | 2.400 | | |
| r7* | 26.775 | | | | |
| | | d7 | 1.900 | N4 1.84506 | ν4 23.66 |
| r8 | 3820.877 | | | | |
| | | d8 | 1.400 to 6.236 to 23.265 | | |
| r9 | ∞ (aperture) | | | | |
| | | d9 | 6.500 to 2.966 to 4.423 | | |
| r10* | 10.443 | | | | |
| | | d10 | 3.200 | N5 1.77250 | ν5 49.77 |
| r11 | 29.467 | | | | |
| | | d11 | 3.600 | | |
| r12 | 27.088 | | | | |
| | | d12 | 1.100 | N6 1.83350 | ν6 21.00 |
| r13 | 8.329 | | | | |
| | | d13 | 3.200 | N7 1.77250 | ν7 49.77 |
| r14* | −38.441 | | | | |
| | | d14 | 1.700 to 5.234 to 3.777 | | |
| r15 | ∞ | | | | |
| | | d15 | 4.840 | N8 1.51680 | ν8 64.20 |
| r16 | ∞ | | | | |
| | | d16 | 2.600 | | |
| r17 | ∞ | | | | |
| | | d17 | 0.590 | N9 1.51680 | ν9 64.20 |
| r18 | ∞ | | | | |

Aspherical Coefficients r7: ε = 0.10000 × 10
A4 = 0.33018 × 10⁻³
A6 = 0.59780 × 10⁻⁵
A8 = −0.13526 × 10⁻⁶
A10 = 0.94977 × 10⁻⁸

R10: ε = 0.10000 × 10
A4 = −0.59883 × 10⁻⁴
A6 = −0.42068 × 10⁻⁶
A8 = 0.19791 × 10⁻⁷
A10 = −0.48787 × 10⁻⁹ r14: ε = 0.10000 × 10
A4 = 0.19506 × 10⁻³
A6 = 0.26452 × 10⁻⁵
A8 = −0.60299 × 10⁻⁷
A10 = 0.24435 × 10⁻⁸

TABLE 2
(2nd Embodiment)

f = 40.1 to 25.0 to 5.3

| Radius of Curvature | | Axial Distance | Refractive Index | | Abbe Number |
|---|---|---|---|---|---|
| r1 | 24.475 | | | | |
| | | d1 | 1.200 | N1 1.83350 | ν1 21.00 |
| r2 | 16.503 | | | | |

TABLE 2-continued
(2nd Embodiment)

| | | d2 | 1.000 | | |
|---|---|---|---|---|---|
| r3 | 17.905 | | | | |
| | | d3 | 3.900 | N2 1.77250 | ν2 49.77 |
| r4 | 622.688 | | | | |
| | | d4 | 23.569 to 19.277 to 1.200 | | |
| r5 | −71.138 | | | | |
| | | d5 | 1.000 | N3 1.77250 | ν3 49.77 |
| r6 | 6.489 | | | | |
| | | d6 | 2.400 | | |
| r7* | 18.772 | | | | |
| | | d7 | 1.900 | N4 1.83350 | ν4 21.00 |
| r8 | 42.748 | | | | |
| | | d8 | 1.400 to 5.693 to 23.769 | | |
| r9 | ∞ (aperture) | | | | |
| | | d9 | 6.500 to 3.601 to 4.368 | | |
| r10* | 18.243 | | | | |
| | | d10 | 3.100 | N5 1.77250 | ν5 49.77 |
| r11 | 147.617 | | | | |
| | | d11 | 3.000 | | |
| r12 | 25.679 | | | | |
| | | d12 | 1.100 | N6 1.83350 | ν6 21.00 |
| r13 | 9.418 | | | | |
| | | d13 | 1.500 | | |
| r14 | 16.625 | | | | |
| | | d14 | 3.300 | N7 1.71300 | ν7 53.93 |
| r15* | −11.380 | | | | |
| | | d15 | 1.700 to 4.599 to 3.832 | | |
| r16 | ∞ | | | | |
| | | d16 | 4.840 | N8 1.51680 | ν8 64.20 |
| r17 | ∞ | | | | |
| | | d17 | 2.600 | | |
| r18 | ∞ | | | | |
| | | d18 | 0.590 | N9 1.51680 | ν9 64.20 |
| r19 | ∞ | | | | |

Aspherical Coefficients r7: ε = 0.10000 × 10
A4 = 0.19461 × 10⁻³
A6 = 0.93836 × 10⁻⁵
A8 = −0.36989 × 10⁻⁶
A10 = 0.95343 × 10⁻⁸

R10: ε = 0.10000 × 10
A4 = −0.13143 × 10⁻³
A6 = −0.23601 × 10⁻⁵
A8 = 0.83517 × 10⁻⁷
A10 = −0.23775 × 10⁻⁸ r15: ε = 0.10000 × 10
A4 = 0.11600 × 10⁻⁴
A6 = −0.82410 × 10⁻⁶
A8 = −0.14039 × 10⁻⁷
A10 = −0.20159 × 10⁻⁹

TABLE 3
(3rd Embodiment)

f = 40.1 to 25.0 to 5.3

| Radius of Curvature | | Axial Distance | Refractive Index | | Abbe Number |
|---|---|---|---|---|---|
| r1 | 23.497 | | | | |
| | | d1 | 1.200 | N1 1.83350 | ν1 21.00 |
| r2 | 15.787 | | | | |
| | | d2 | 1.000 | | |
| r3 | 17.175 | | | | |
| | | d3 | 3.600 | N2 1.77250 | ν2 49.77 |
| r4 | 651.254 | | | | |
| | | d4 | 22.633 to 18.350 to 1.200 | | |
| r5 | −83.008 | | | | |
| | | d5 | 1.000 | N3 1.77250 | ν3 49.77 |
| r6 | 6.054 | | | | |
| | | d6 | 2.400 | | |
| r7* | 15.967 | | | | |
| | | d7 | 1.900 | N4 1.83350 | ν4 21.00 |
| r8 | 31.154 | | | | |
| | | d8 | 1.400 to 5.684 to 22.833 | | |
| r9 | ∞ (aperture) | | | | |
| | | d9 | 6.500 to 3.366 to 4.507 | | |
| r10* | 27.356 | | | | |
| | | d10 | 2.700 | N5 1.77250 | ν5 49.77 |
| r11 | −35.609 | | | | |
| | | d11 | 3.000 | | |
| r12 | 41.327 | | | | |

TABLE 3-continued (3rd Embodiment)

| | | | | | | |
|---|---|---|---|---|---|---|
| | | d12 | 1.100 N6 | 1.83350 $\nu 6$ | 21.00 | |
| r13 | 11.925 | | | | | |
| | | d13 | 1.500 | | | |
| r14 | 20.469 | | | | | |
| | | d14 | 3.700 N7 | 1.60311 $\nu 7$ | 60.74 | |
| r15* | −10.089 | | | | | |
| | | d15 | 1.700 to 4.834 to 3.693 | | | |
| r16 | ∞ | | | | | |
| | | d16 | 4.840 N8 | 1.51680 $\nu 8$ | 64.20 | |
| r17 | ∞ | | | | | |
| | | d17 | 2.600 | | | |
| r18 | ∞ | | | | | |
| | | d18 | 0.590 N9 | 1.51680 $\nu 9$ | 64.20 | |
| r19 | ∞ | | | | | |

Aspherical Coefficients r7: $\epsilon = 0.10000 \times 10$
  $A4 = 0.23640 \times 10^{-3}$
  $A6 = 0.10225 \times 10^{-4}$
  $A8 = -0.55733 \times 10^{-6}$
  $A10 = 0.19161 \times 10^{-7}$ r10: $\epsilon = 0.10000 \times 10$
  $A4 = -0.13682 \times 10^{-3}$
  $A6 = -0.28296 \times 10^{-5}$
  $A8 = 0.90154 \times 10^{-7}$
  $A10 = -0.23309 \times 10^{-8}$ r15: $\epsilon = 0.10000 \times 10$
  $A4 = 0.71074 \times 10^{-4}$
  $A6 = -0.22303 \times 10^{-5}$
  $A8 = 0.74298 \times 10^{-7}$
  $A10 = -0.13262 \times 10^{-8}$

TABLE 4

(4th Embodiment)

f = 40.1 to 25.0 to 5.3

| | Radius of Curvature | | Axial Distance | Refractive Index | | Abbe Number |
|---|---|---|---|---|---|---|
| r1 | 23.421 | | | | | |
| | | d1 | 1.200 | N1 1.83350 | $\nu 1$ | 21.00 |
| r2 | 15.690 | | | | | |
| | | d2 | 1.000 | | | |
| r3 | 17.075 | | | | | |
| | | d3 | 3.600 | N2 1.77250 | $\nu 2$ | 49.77 |
| r4 | 613.828 | | | | | |
| | | d4 | 23.021 to 18.095 to 1.200 | | | |
| r5 | −81.057 | | | | | |
| | | d5 | 1.000 | N3 1.77250 | $\nu 3$ | 49.77 |
| r6 | 6.056 | | | | | |
| | | d6 | 2.400 | | | |
| r7* | 16.019 | | | | | |
| | | d7 | 1.900 | N4 1.83350 | $\nu 4$ | 21.00 |
| r8 | 31.512 | | | | | |
| | | d8 | 1.400 to 6.326 to 23.221 | | | |
| r9 | ∞ (aperture) | | | | | |
| | | d9 | 6.500 to 2.872 to 4.142 | | | |
| r10 | 16.062 | | | | | |
| | | d10 | 2.700 | N5 1.77250 | $\nu 5$ | 49.77 |
| r11 | −43.357 | | | | | |
| | | d11 | 0.100 | | | |
| r12 | 9.345 | | | | | |
| | | d12 | 2.700 | N6 1.71300 | $\nu 6$ | 53.93 |
| r13 | 21.779 | | | | | |
| | | d13 | 0.800 | | | |
| r14 | −51.114 | | | | | |
| | | d14 | 1.100 | N7 1.83350 | $\nu 7$ | 21.00 |
| r15 | 12.093 | | | | | |
| | | d15 | 1.500 | | | |
| r16 | −72.833 | | | | | |
| | | d16 | 3.000 | N8 1.64000 | $\nu 8$ | 58.61 |
| r17* | −10.160 | | | | | |
| | | d17 | 1.700 to 5.328 to 4.058 | | | |
| r18 | ∞ | | | | | |
| | | d18 | 4.840 | N9 1.51680 | $\nu 9$ | 64.20 |
| r19 | ∞ | | | | | |

Aspherical Coefficients r7: $\epsilon = 0.10000 \times 10$
  $A4 = 0.26043 \times 10^{-3}$
  $A6 = 0.45238 \times 10^{-5}$
  $A8 = -0.11001 \times 10^{-6}$ r17: $\epsilon = 0.10000 \times 10$
  $A4 = 0.47755 \times 10^{-3}$
  $A6 = -0.22523 \times 10^{-7}$
  $A8 = 0.34550 \times 10^{-6}$

TABLE 4-continued (4th Embodiment)

$A10 = 0.67972 \times 10^{-8}$     $A10 = -0.15381 \times 10^{-7}$

TABLE 5

(5th Embodiment)

f = 40.1 to 25.0 to 5.3

| | Radius of Curvature | | Axial Distance | Refractive Index | | Abbe Number |
|---|---|---|---|---|---|---|
| r1 | 23.534 | | | | | |
| | | d1 | 1.200 | N1 1.83350 | $\nu 1$ | 21.00 |
| r2 | 15.626 | | | | | |
| | | d2 | 1.000 | | | |
| r3 | 17.029 | | | | | |
| | | d3 | 3.800 | N2 1.77250 | $\nu 2$ | 49.77 |
| r4 | 1874.274 | | | | | |
| | | d4 | 22.326 to 17.079 to 1.200 | | | |
| r5 | −54.392 | | | | | |
| | | d5 | 1.000 | N3 1.77250 | $\nu 3$ | 49.77 |
| r6 | 5.933 | | | | | |
| | | d6 | 2.400 | | | |
| r7* | 16.783 | | | | | |
| | | d7 | 1.900 | N4 1.83350 | $\nu 4$ | 21.00 |
| r8 | 35.373 | | | | | |
| | | d8 | 1.400 to 6.647 to 22.526 | | | |
| r9 | ∞ (aperture) | | | | | |
| | | d9 | 6.500 to 2.550 to 4.787 | | | |
| r10 | 13.814 | | | | | |
| | | d10 | 2.700 | N5 1.77250 | $\nu 5$ | 49.77 |
| r11 | −329.789 | | | | | |
| | | d11 | 0.100 | | | |
| r12 | 10.189 | | | | | |
| | | d12 | 2.700 | N6 1.71300 | $\nu 6$ | 53.93 |
| r13 | 17.118 | | | | | |
| | | d13 | 0.800 | | | |
| r14 | −361.972 | | | | | |
| | | d14 | 1.100 | N7 1.83350 | $\nu 7$ | 21.00 |
| r15 | 11.508 | | | | | |
| | | d15 | 0.900 | | | |
| r16 | 19.028 | | | | | |
| | | d16 | 2.400 | N8 1.64000 | $\nu 8$ | 58.61 |
| r17* | −19.283 | | | | | |
| | | d17 | 1.700 to 5.650 to 3.413 | | | |
| r18 | ∞ | | | | | |
| | | d18 | 4.840 | N9 1.51680 | $\nu 9$ | 64.20 |
| r19 | ∞ | | | | | |

Aspherical Coefficients r7: $\epsilon = 0.10000 \times 10$
  $A4 = 0.25769 \times 10^{-3}$
  $A6 = 0.77574 \times 10^{-5}$
  $A8 = -0.68977 \times 10^{-7}$
  $A10 = 0.12665 \times 10^{-8}$ r17: $\epsilon = 0.10000 \times 10$
  $A4 = 0.37525 \times 10^{-3}$
  $A6 = -0.48118 \times 10^{-6}$
  $A8 = 0.54868 \times 10^{-6}$
  $A10 = -0.20924 \times 10^{-7}$

TABLE 6

(6th Embodiment)

f = 40.1 to 25.0 to 5.3

| | Radius of Curvature | | Axial Distance | Refractive Index | | Abbe Number |
|---|---|---|---|---|---|---|
| r1 | 22.839 | | | | | |
| | | d1 | 1.200 | N1 1.83350 | $\nu 1$ | 21.00 |
| r2 | 16.052 | | | | | |
| | | d2 | 1.000 | | | |
| r3 | 17.635 | | | | | |
| | | d3 | 3.700 | N2 1.77250 | $\nu 2$ | 49.77 |
| r4 | 412.745 | | | | | |
| | | d4 | 22.167 to 16.704 to 1.200 | | | |
| r5 | −75.466 | | | | | |
| | | d5 | 1.000 | N3 1.77250 | $\nu 3$ | 49.77 |
| r6 | 5.795 | | | | | |
| | | d6 | 2.400 | | | |
| r7* | 15.566 | | | | | |
| | | d7 | 1.900 | N4 1.83350 | $\nu 4$ | 21.00 |
| r8 | 28.154 | | | | | |
| | | d8 | 1.400 to 6.864 to 22.367 | | | |

TABLE 6-continued (6th Embodiment)

| | Radius of Curvature | | Axial Distance | | Refractive Index | | Abbe Number |
|---|---|---|---|---|---|---|---|
| r9 | ∞ (aperture) | | | | | | |
| | | d9 | 6.500 to 2.736 to 5.836 | | | | |
| r10 | 12.563 | | | | | | |
| | | d10 | 2.700 | N5 | 1.77250 | ν5 | 49.77 |
| r11 | 352.623 | | | | | | |
| | | d11 | 0.100 | | | | |
| r12 | 10.451 | | | | | | |
| | | d12 | 2.700 | N6 | 1.71300 | ν6 | 53.93 |
| r13 | 16.305 | | | | | | |
| | | d13 | 0.800 | | | | |
| r14 | 454.188 | | | | | | |
| | | d14 | 1.100 | N7 | 1.83350 | ν7 | 21.00 |
| r15 | 11.123 | | | | | | |
| | | d15 | 0.900 | | | | |
| r16 | 15.178 | | | | | | |
| | | d16 | 2.400 | N8 | 1.64000 | ν8 | 58.61 |
| r17* | −28.847 | | | | | | |
| | | d17 | 1.700 to 5.464 to 2.364 | | | | |
| r18 | ∞ | | | | | | |
| | | d18 | 4.840 | N9 | 1.51680 | ν9 | 64.20 |
| r19 | ∞ | | | | | | |

Aspherical Coefficients r7: $\epsilon = 0.10000 \times 10$
$A4 = 0.27349 \times 10^{-3}$
$A6 = 0.66979 \times 10^{-5}$
$A8 = -0.46715 \times 10^{-7}$
$A10 = 0.14142 \times 10^{-8}$ r17: $\epsilon = 0.10000 \times 10$
$A4 = 0.42905 \times 10^{-3}$
$A6 = 0.38602 \times 10^{-6}$
$A8 = 0.54619 \times 10^{-6}$
$A10 = -0.19667 \times 10^{-7}$

TABLE 7

(7th Embodiment)

f = 52.3 to 33.0 to 5.5

| | Radius of Curvature | | Axial Distance | | Refractive Index | | Abbe Number |
|---|---|---|---|---|---|---|---|
| r1 | 44.213 | | | | | | |
| | | d1 | 1.300 | N1 | 1.83350 | ν1 | 21.00 |
| r2 | 27.290 | | | | | | |
| | | d2 | 5.500 | N2 | 1.69680 | ν2 | 56.47 |
| r3 | 491.961 | | | | | | |
| | | d3 | 0.100 | | | | |
| r4 | 26.398 | | | | | | |
| | | d4 | 3.000 | N3 | 1.69680 | ν3 | 56.47 |
| r5 | 46.159 | | | | | | |
| | | d5 | 24.446 to 19.993 to 1.000 | | | | |
| r6 | 33.890 | | | | | | |
| | | d6 | 0.900 | N4 | 1.77250 | ν4 | 49.77 |
| r7 | 6.438 | | | | | | |
| | | d7 | 3.000 | | | | |
| r8 | −39.691 | | | | | | |
| | | d8 | 0.900 | N5 | 1.77250 | ν5 | 49.77 |
| r9 | 24.884 | | | | | | |
| | | d9 | 1.000 | | | | |
| r10 | 12.242 | | | | | | |
| | | d10 | 2.000 | N6 | 1.83350 | ν6 | 21.00 |
| r11 | 24.006 | | | | | | |
| | | d11 | 1.500 to 5.953 to 24.946 | | | | |
| r12 | ∞ (aperture) | | | | | | |
| | | d12 | 8.700 to 4.195 to 7.121 | | | | |
| r13 | 13.165 | | | | | | |
| | | d13 | 4.000 | N7 | 1.60311 | ν7 | 60.74 |
| r14* | −69.787 | | | | | | |
| | | d14 | 5.500 | | | | |
| r15 | 30.717 | | | | | | |
| | | d15 | 0.900 | N8 | 1.84666 | ν8 | 23.82 |
| r16 | 8.909 | | | | | | |
| | | d16 | 5.000 | N9 | 1.69680 | ν9 | 56.47 |
| r17* | −37.742 | | | | | | |
| | | d17 | 1.500 to 6.005 to 3.079 | | | | |
| r18 | ∞ | | | | | | |
| | | d18 | 3.000 | N10 | 1.51680 | ν10 | 64.20 |
| r19 | ∞ | | | | | | |

Aspherical Coefficients r14: $\epsilon = 0.10000 \times 10$
$A4 = 0.90216 \times 10^{-4}$ r17: $\epsilon = 0.10000 \times 10$
$A4 = 0.40553 \times 10^{-4}$

TABLE 7-continued (7th Embodiment)

$A6 = 0.56566 \times 10^{-6}$
$A8 = -0.36594 \times 10^{-7}$
$A10 = 0.10055 \times 10^{-8}$
$A12 = -0.96558 \times 10^{-11}$ $A6 = 0.67463 \times 10^{-5}$
$A8 = -0.67594 \times 10^{-6}$
$A10 = 0.33500 \times 10^{-7}$
$A12 = -0.60599 \times 10^{-9}$

TABLE 8

(8th Embodiment)

f = 52.2 to 33.0 to 5.5

| | Radius of Curvature | | Axial Distance | | Refractive Index | | Abbe Number |
|---|---|---|---|---|---|---|---|
| r1 | 47.447 | | | | | | |
| | | d1 | 1.300 | N1 | 1.83350 | ν1 | 21.00 |
| r2 | 28.472 | | | | | | |
| | | d2 | 5.100 | N2 | 1.69680 | ν2 | 56.47 |
| r3 | 3410.292 | | | | | | |
| | | d3 | 0.100 | | | | |
| r4 | 24.782 | | | | | | |
| | | d4 | 3.000 | N3 | 1.69680 | ν3 | 56.47 |
| r5 | 45.006 | | | | | | |
| | | d5 | 23.464 to 18.595 to 1.000 | | | | |
| r6 | 44.568 | | | | | | |
| | | d6 | 0.900 | N4 | 1.77250 | ν4 | 49.77 |
| r7 | 6.385 | | | | | | |
| | | d7 | 3.000 | | | | |
| r8 | −51.731 | | | | | | |
| | | d8 | 0.900 | N5 | 1.77250 | ν5 | 49.77 |
| r9 | 32.401 | | | | | | |
| | | d9 | 1.000 | | | | |
| r10 | 10.734 | | | | | | |
| | | d10 | 2.000 | N6 | 1.83350 | ν6 | 21.00 |
| r11 | 15.760 | | | | | | |
| | | d11 | 1.500 to 6.369 to 23.963 | | | | |
| r12 | ∞ (aperture) | | | | | | |
| | | d12 | 8.700 to 3.069 to 6.026 | | | | |
| r13 | 11.676 | | | | | | |
| | | d13 | 3.800 | N7 | 1.60311 | ν7 | 60.74 |
| r14 | 48.155 | | | | | | |
| | | d14 | 0.100 | | | | |
| r15 | 11.233 | | | | | | |
| | | d15 | 3.200 | N8 | 1.77250 | ν8 | 49.77 |
| r16 | 28.935 | | | | | | |
| | | d16 | 1.000 | | | | |
| r17 | −2789.789 | | | | | | |
| | | d17 | 0.900 | N9 | 1.80518 | ν9 | 25.43 |
| r18 | 8.788 | | | | | | |
| | | d18 | 1.000 | | | | |
| r19 | 8.695 | | | | | | |
| | | d19 | 3.000 | N10 | 1.71300 | ν10 | 53.93 |
| r20* | 3328.895 | | | | | | |
| | | d20 | 1.500 to 7.131 to 4.174 | | | | |
| r21 | ∞ | | | | | | |
| | | d21 | 3.000 | N11 | 1.51680 | ν11 | 64.20 |
| r22 | ∞ | | | | | | |

Aspherical Coefficients r20: $\epsilon = 0.10000 \times 10$
$A4 = 0.44850 \times 10^{-3}$
$A6 = 0.87324 \times 10^{-5}$
$A8 = -0.66098 \times 10^{-6}$
$A10 = 0.33684 \times 10^{-7}$
$A12 = -0.60241 \times 10^{-9}$

TABLE 9

(9th Embodiment)

f = 52.2 to 33.0 to 5.5

| | Radius of Curvature | | Axial Distance | | Refractive Index | | Abbe Number |
|---|---|---|---|---|---|---|---|
| r1 | 51.883 | | | | | | |
| | | d1 | 1.300 | N1 | 1.83350 | ν1 | 21.00 |
| r2 | 29.250 | | | | | | |
| | | d2 | 5.500 | N2 | 1.69680 | ν2 | 56.47 |
| r3 | −1422.839 | | | | | | |
| | | d3 | 0.100 | | | | |

TABLE 9-continued (9th Embodiment)

| r4 | 24.355 | | | | | |
|---|---|---|---|---|---|---|
| | | d4 | 3.000 | N3 1.69680 | ν3 | 56.47 |
| r5 | 47.580 | | | | | |
| | | d5 | 23.002 to 19.218 to 1.001 | | | |
| r6 | 43.604 | | | | | |
| | | d6 | 0.900 | N4 1.77250 | ν4 | 49.77 |
| r7 | 6.523 | | | | | |
| | | d7 | 3.000 | | | |
| r8 | −38.389 | | | | | |
| | | d8 | 0.900 | N5 1.77250 | ν5 | 49.77 |
| r9 | 28.171 | | | | | |
| | | d9 | 1.000 | | | |
| r10 | 12.300 | | | | | |
| | | d10 | 2.000 | N6 1.83350 | ν6 | 21.00 |
| r11 | 23.245 | | | | | |
| | | d11 | 1.500 to 5.283 to 23.501 | | | |
| r12 | ∞ (aperture) | | | | | |
| | | d12 | 8.700 to 4.156 to 5.693 | | | |
| r13 | 11.273 | | | | | |
| | | d13 | 4.000 | N7 1.67000 | ν7 | 57.07 |
| r14* | −45.381 | | | | | |
| | | d14 | 4.600 | | | |
| r15 | 57.525 | | | | | |
| | | d15 | 0.900 | N8 1.84666 | ν8 | 23.82 |
| r16 | 7.444 | | | | | |
| | | d16 | 1.000 | | | |
| r17 | 9.288 | | | | | |
| | | d17 | 5.000 | N9 1.71300 | ν9 | 53.93 |
| r18* | −21.777 | | | | | |
| | | d18 | 1.500 to 6.044 to 4.507 | | | |
| r19 | ∞ | | | | | |
| | | d19 | 3.000 | N10 1.51680 | ν10 | 64.20 |
| r20 | ∞ | | | | | |

Aspherical Coefficients

| r14: ε = 0.10000 × 10 | r18: ε = 0.10000 × 10 |
|---|---|
| A4 = 0.18675 × 10$^{-3}$ | A4 = −0.22193 × 10$^{-4}$ |
| A6 = −0.43673 × 10$^{-5}$ | A6 = 0.71876 × 10$^{-5}$ |
| A8 = 0.27905 × 10$^{-6}$ | A8 = −0.66877 × 10$^{-6}$ |
| A10 = −0.82852 × 10$^{-8}$ | A10 = 0.33669 × 10$^{-7}$ |
| A12 = 0.88209 × 10$^{-10}$ | A12 = −0.60198 × 10$^{-9}$ |

TABLE 10

| | ν1N | ν2P | ν3N |
|---|---|---|---|
| 1st Embodiment | 21.00 | 23.66 | 21.00 |
| 2nd Embodiment | 21.00 | 21.00 | 21.00 |
| 3rd Embodiment | 21.00 | 21.00 | 21.00 |
| 4th Embodiment | 21.00 | 21.00 | 21.00 |
| 5th Embodiment | 21.00 | 21.00 | 21.00 |
| 6th Embodiment | 21.00 | 21.00 | 21.00 |
| 7th Embodiment | 21.00 | 21.00 | 23.82 |
| 8th Embodiment | 21.00 | 21.00 | 25.43 |
| 9th Embodiment | 21.00 | 21.00 | 23.82 |

TABLE 11

| | fS · φ1 | \|φ2\| · Z² · Y' | $\frac{\|\phi 2\|}{\phi 1} \cdot \frac{Y'}{fS} \cdot Z^2$ |
|---|---|---|---|
| 1st Embodiment | 0.144720 | 14.6680 | 101.3547 |
| 2nd Embodiment | 0.138983 | 13.7998 | 99.2909 |
| 3rd Embodiment | 0.144720 | 14.6680 | 101.3543 |
| 4th Embodiment | 0.144720 | 14.6680 | 101.3543 |
| 5th Embodiment | 0.147614 | 15.5658 | 105.4491 |
| 6th Embodiment | 0.144720 | 15.8725 | 109.6774 |
| 7th Embodiment | 0.133100 | 32.0063 | 240.4677 |
| 8th Embodiment | 0.144072 | 32.6463 | 226.5978 |
| 9th Embodiment | 0.141247 | 33.2993 | 235.7522 |

What is claimed is:

1. A variable focal length lens system, comprising from an object side to an image side:
   a first positive lens unit consisting of at least two lens elements;
   a second negative lens unit consisting of two lens elements and shifting along an optical axis during a zooming operation; and
   a third positive lens unit consisting of at least two lens elements and shifting along the optical axis during the zooming operation;
   wherein the lens system fulfills the following conditions:

$$0.10 \leq fS \cdot \phi 1 \leq 0.15$$
$$11.890 < |\phi 2| \cdot Z^2 \cdot Y' < 18.649$$
$$83.401 < \frac{|\phi 2|}{\phi 1} \cdot \frac{Y'}{fS} \cdot Z^2 < 121.791$$

wherein
fS represents the shortest focal length of the lens system;
φ1 represents a refractive power of the first lens unit;
φ2 represents a refractive power of the second lens unit;
Z represents a zoom ratio; and
Y' represents an image height.

2. A variable focal length lens system as claimed in claim 1, wherein each of the lens units includes a high dispersion lens element having an opposite refractive power to its refractive power, and the lens system fulfills the following conditions:

$$\nu 1N < 30$$
$$\nu 2P < 30$$
$$\nu 3N < 30$$

wherein ν1N represents an Abbe number of the negative high dispersion lens element in the first lens unit; wherein ν2P represents an Abbe number of the positive high dispersion lens element in the second lens unit; and wherein ν3N represents an Abbe number of the negative high dispersion lens element in the third lens unit.

3. A variable focal length lens system as claimed in claim 1, wherein the first lens unit is fixed on the optical axis during the zooming operation.

4. A variable focal length lens system as claimed in claim 1, wherein the first lens unit consists of from the object side to the image side a negative lens element whose image side surface is concave to the image side and has a stronger refractive power than its object side surface, and a positive lens element whose object side surface is convex to the object side.

5. A variable focal length lens system as claimed in claim 1, wherein the second lens unit consists of from the object side to the image side a negative lens element whose image side surface is concave to the image side and has a stronger refractive power than its object side surface, and a positive lens element.

6. A variable focal length lens system as claimed in claim 1, wherein the third lens unit consists of from the object side to the image side a first positive, a second negative and a third positive lens elements, and wherein at least one of the positive lens elements has an aspherical surface.

7. A variable focal length lens system as claimed in claim 6, wherein both of the first and third positive lens elements have an aspherical surface each.

8. A variable focal length lens system as claimed in claim 1, wherein the third lens unit consists of from the object side to the image side a first positive, a second positive, a third negative and a fourth positive lens elements, and wherein one of the positive lens elements has an aspherical surface.

9. A variable focal length lens system as claimed in claim 8, wherein the fourth positive lens element has an aspherical surface.

10. A variable focal length lens system, comprising from an object side to an image side:
- a first positive lens unit consisting of at least two lens elements;
- a second negative lens unit consisting of at least three lens elements and shifting along an optical axis during a zooming operation; and
- a third positive lens unit consisting of at least two lens elements and shifting along the optical axis during the zooming operation;
- wherein the lens system fulfills the following conditions:

$$0.10 \leq fS \cdot \phi1 \leq 0.15$$
$$28.5 < |\phi2| \cdot Z^2 \cdot Y' < 47.5$$
$$194.75 < \frac{|\phi2|}{\phi1} \cdot \frac{Y'}{fS} \cdot Z^2 < 285$$

wherein
- fS represents the shortest focal length of the lens system;
- $\phi1$ represents a refractive power of the first lens unit;
- $\phi2$ represents a refractive power of the second lens unit;
- Z represents a zoom ratio; and
- Y' represents an image height.

11. A variable focal length lens system as claimed in claim 10, wherein each of the lens units includes a high dispersion lens element having an opposite refractive power to its refractive power, and the lens system fulfills the following conditions:

$$\nu1N < 30$$
$$\nu2P < 30$$
$$\nu3N < 30$$

wherein $\nu1N$ represents an Abbe number of the negative high dispersion lens element in the first lens unit; wherein $\nu2P$ represents an Abbe number of the positive high dispersion lens element in the second lens unit; and wherein $\nu3N$ represents an Abbe number of the negative high dispersion lens element in the third lens unit.

12. A variable focal length lens system as claimed in claim 10, wherein the first lens unit is fixed on the optical axis during the zooming operation.

13. A variable focal length lens system as claimed in claim 10, wherein the first lens unit consists of three lens elements including from the object side to the image side a negative lens element whose image side surface is concave to the image side, and a positive lens element whose object side surface is convex to the object side and has a stronger refractive power than its image side surface.

14. A variable focal length lens system as claimed in claim 10, wherein the second lens unit consists of from the object side to the image side a negative lens element whose image side surface is concave to the image side and has a stronger refractive power than its object side surface, a negative lens element, and a positive lens element.

15. A variable focal length lens system as claimed in claim 10, wherein the third lens unit consists of from the object side to the image side a first positive, a second negative and a third positive lens elements, and wherein at least one of the positive lens elements has an aspherical surface.

16. A variable focal length lens system as claimed in claim 15, wherein both of the first and third positive lens elements have an aspherical surface each.

17. A variable focal length lens system as claimed in claim 10, wherein the third lens unit consists of from the object side to the image side a first positive, a second positive, a third negative and a fourth positive lens elements, and wherein one of the positive lens elements has an aspherical surface.

18. A variable focal length lens system as claimed in claim 17, wherein the fourth positive lens element has an aspherical surface.

* * * * *